US 6,751,264 B2

(12) United States Patent
Ho et al.

(10) Patent No.: US 6,751,264 B2
(45) Date of Patent: Jun. 15, 2004

(54) RECEIVER AND METHOD THEREFOR

(75) Inventors: Yui-Luen Ho, Austin, TX (US);
Junsong Li, Austin, TX (US); Azfar Inayatullah, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 242 days.

(21) Appl. No.: 09/916,684

(22) Filed: Jul. 27, 2001

(65) Prior Publication Data

US 2003/0026365 A1 Feb. 6, 2003

(51) Int. Cl.[7] ................................. H04L 1/02
(52) U.S. Cl. ................. 375/267; 375/347; 375/349; 370/286; 370/287; 455/52.3; 455/273; 455/276.1; 455/277.1; 455/303; 329/320; 329/353
(58) Field of Search ................. 375/219, 226, 375/227, 259, 260, 267, 285, 324–327, 340, 346, 347, 349; 455/50.1, 52.1–52.3, 63, 65, 67.1, 67.3, 67.6, 131–143, 146, 207, 214, 226.1, 226.2, 272, 273, 276.1, 277.1, 277.2, 277.3, 284, 295, 296, 303–305, 570; 370/286, 287; 329/302, 306, 307, 318, 320, 325, 349, 353, 360

(56) References Cited

U.S. PATENT DOCUMENTS

| 4,210,871 | A | | 7/1980 | Hill et al. | |
|---|---|---|---|---|---|
| 4,384,358 | A | * | 5/1983 | Shiki et al. | 375/347 |
| 5,179,575 | A | * | 1/1993 | Pierce et al. | 375/232 |
| 5,203,023 | A | * | 4/1993 | Saito et al. | 455/133 |
| 5,203,025 | A | * | 4/1993 | Anvari et al. | 455/134 |
| 5,263,180 | A | | 11/1993 | Hirayama et al. | |
| 5,321,850 | A | | 6/1994 | Backstrom et al. | |
| 5,487,091 | A | | 1/1996 | Jasper et al. | |
| 5,513,222 | A | * | 4/1996 | Iwasaki | 375/347 |
| 5,530,925 | A | * | 6/1996 | Garner | 455/273 |
| 5,630,213 | A | | 5/1997 | Vannatta | |
| 5,659,572 | A | | 8/1997 | Schiling | |
| 5,697,083 | A | | 12/1997 | Sano | |
| 5,710,995 | A | | 1/1998 | Akaiwa et al. | |
| 6,067,295 | A | | 5/2000 | Bahai et al. | |
| 6,078,633 | A | | 6/2000 | Shiotsu et al. | |
| 6,094,422 | A | * | 7/2000 | Alelyunas et al. | 370/286 |
| 6,115,591 | A | | 9/2000 | Hwang | |
| 6,151,487 | A | | 11/2000 | Kim et al. | |
| 6,172,970 | B1 | | 1/2001 | Ling et al. | |
| 6,304,598 | B1 | * | 10/2001 | Agazzi et al. | 375/232 |
| 6,493,381 | B1 | * | 12/2002 | Werner et al. | 375/232 |
| 6,546,236 | B1 | * | 4/2003 | Canada et al. | 455/304 |

FOREIGN PATENT DOCUMENTS

EP    0 967 746 A2    12/1999

OTHER PUBLICATIONS

John R. Treichler et al., "A New Approach to Multipath Correction of Constant Modulus Signals", 1983 IEEE Transactions On Acoustics, Speech, and Signal Processing, vol. ASSP–31, No. 2, 14 pgs.

* cited by examiner

Primary Examiner—Stephen Chin
Assistant Examiner—Dac V. Ha
(74) Attorney, Agent, or Firm—Joanna G. Chiu; Susan C. Hill

(57) ABSTRACT

Embodiments of the present invention relate generally to receivers. One embodiment relates to a digital FM receiver having multiple sensors (e.g. antennas). In one embodiment, the digital receiver includes a baseband unit having a channel processing unit. In one embodiment, the channel processing unit is capable of calculating or estimating a phase difference between the incoming signals prior to combining them. One embodiment uses phase estimation method for diversity combining the signals while another embodiment utlizes a hybrid phase lock loop method. Also, some embodiments of the present invention provide for echo-cancelling after diversity combining. An alternate embodiment of the channel processing unit utilizes a space-time unit to diversity combine and provide echo cancelling for the incoming signals. Other embodiments of the present invention allow for the incoming signals from the multiple antennas to pass through the baseband unit uncombined, where the incoming signals may have different data formats.

18 Claims, 17 Drawing Sheets

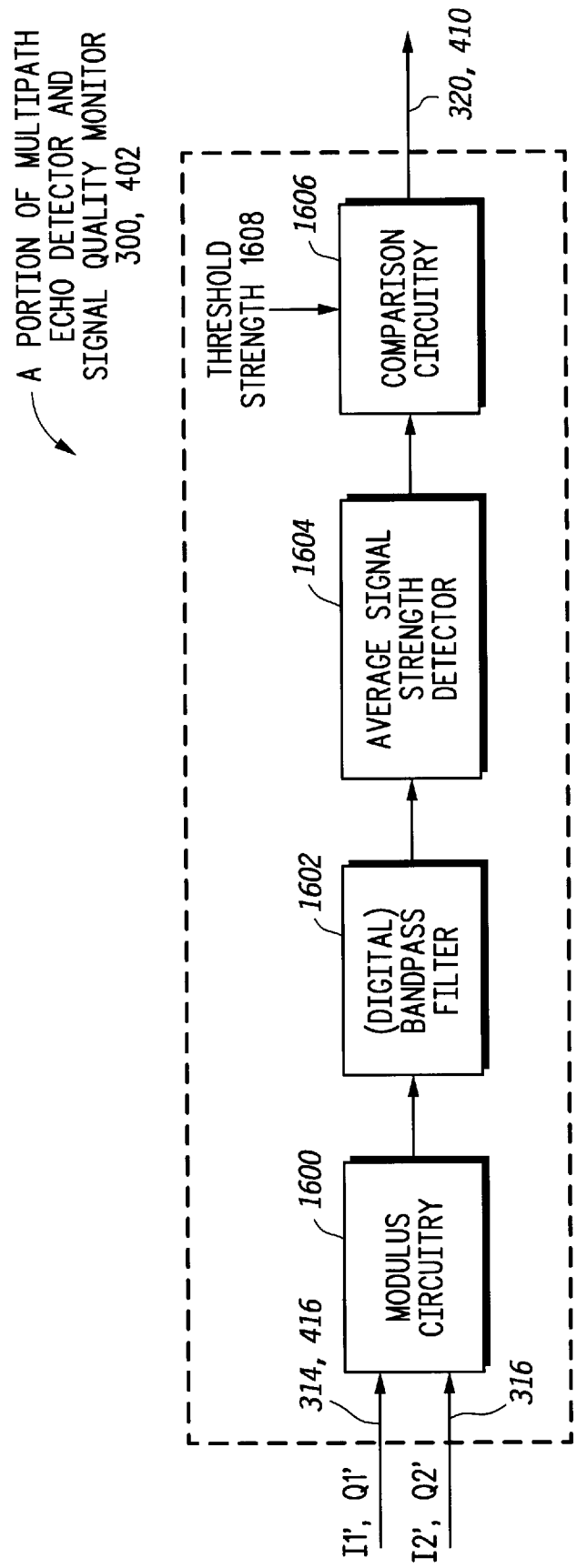

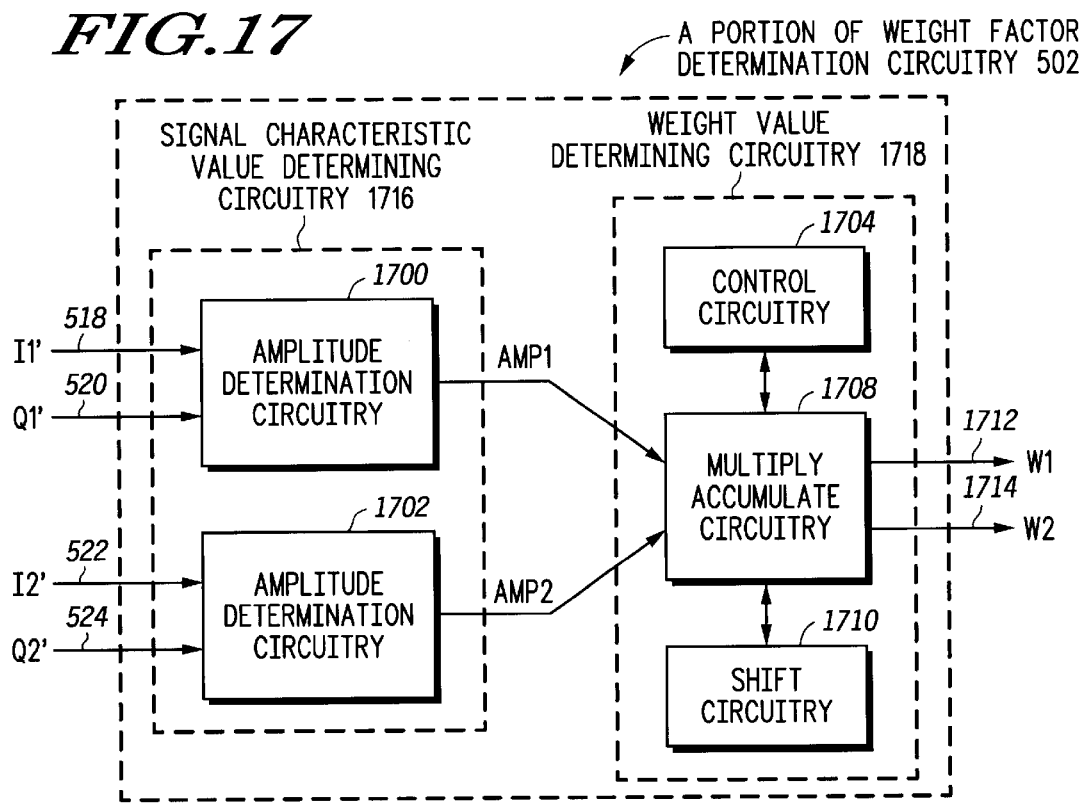
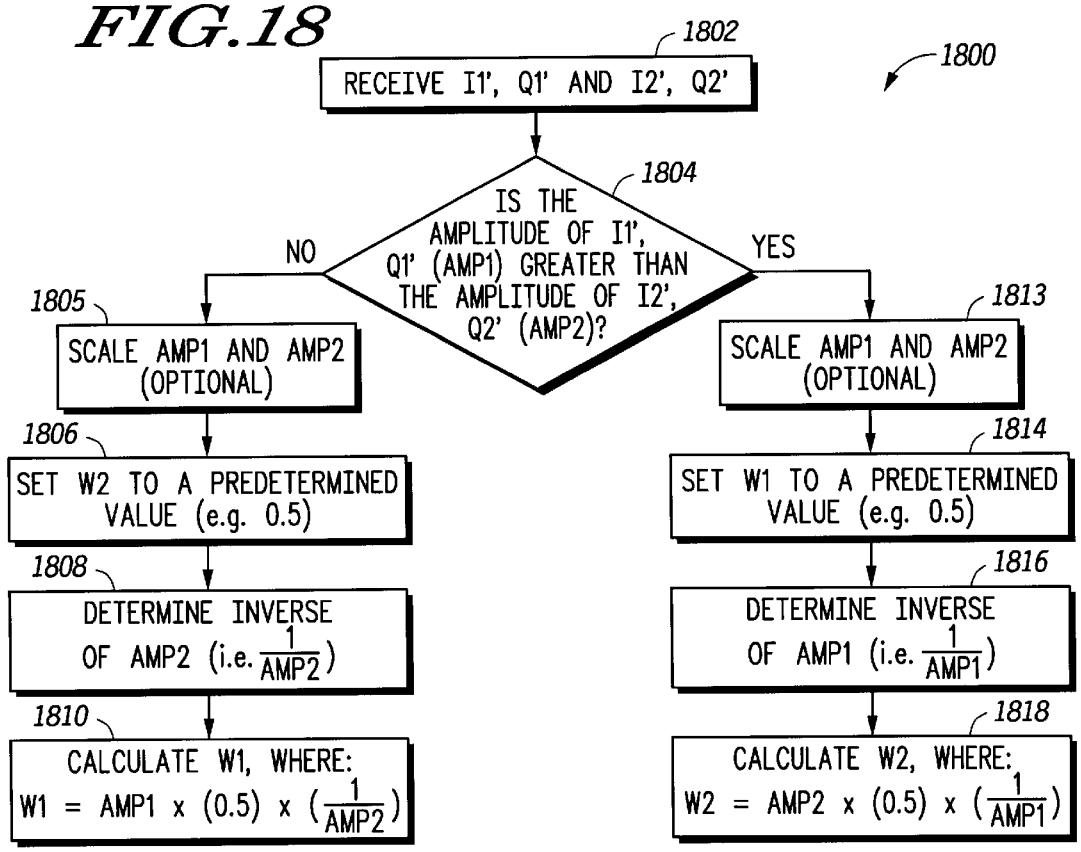

RECEIVER AND METHOD THEREFOR

RELATED APPLICATIONS

This is related to U.S. patent application Ser. No. 09/803,750 filed Mar. 12, 2001, and entitled "Demodulator For A Radio Receiver And Method Of Operation," U.S. patent application Ser. No. 09/818,337 filed Mar. 28, 2001, and entitled "Radio Receiver Having A Dynamic Bandwidth Filter And Method Therefor," United States Patent Application having attorney docket number SC11662TH filed May 31, 2001, and entitled "Method And Apparatus For Combining A Wireless Receiver And A Non-Wireless Receiver," United States Patent Application having attorney docket number SC11311 ITS, filed on even date, and entitled "Receiver and Method Therefor," and United States Patent Application having attorney docket number SC 11312TS, filed on even date, and entitled "Receiver and Method Therefor" and are assigned to the current assignee hereof.

FIELD OF THE INVENTION

The present invention relates generally to receivers and more specifically to radio receivers.

RELATED ART

Multiple sensors such as antennas are typically used to provide more information to a receiver. However, the multiple sensors generally receive a superposition of differently delayed and attenuated versions of a transmitted signal due at least in part to unintentional reflections and scattering. The multipath components received from the transmitted signals typically have different phases that may constructively or destructively add together, thereby causing the fading of the received signals. Therefore, a need exists for an improved receiver to effectively combine or process these received signals from multiple sensors. Furthermore, a need exists to reduce the effects of multipath echo and increase the reliability level of these receivers.

BRIEF DESCRIPTION OF THE DRAWINGS

The present invention is illustrated by way of example and not limitation in the accompanying figures, in which like references indicate similar elements, and in which:

FIG. 16 illustrates, in block diagram form, a portion of the multipath echo detector and signal quality monitor of FIG. 3 or 4, according to one embodiment of the present invention.

FIG. 17 illustrates, in block diagram form, a portion of weighting factor determination circuitry of FIG. 5 according to an alternate embodiment of the present invention.

FIG. 18 illustrates, in flow diagram form, operation of weight value determining circuitry of FIG. 17, according to one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Figure 1:
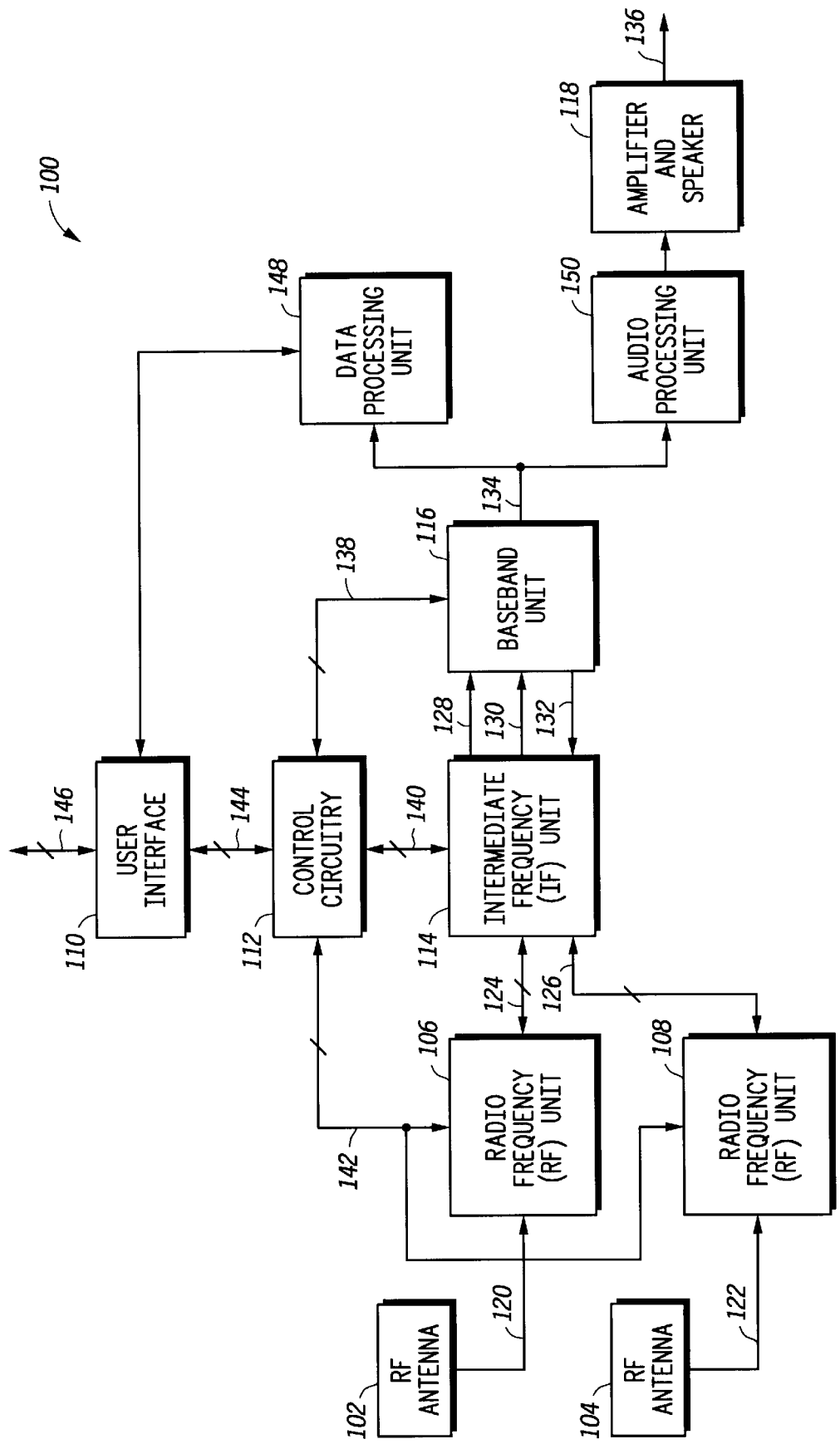
FIG. 1 illustrates, in block diagram form, a radio receiver in accordance with one embodiment of the present invention.
Figure 2:
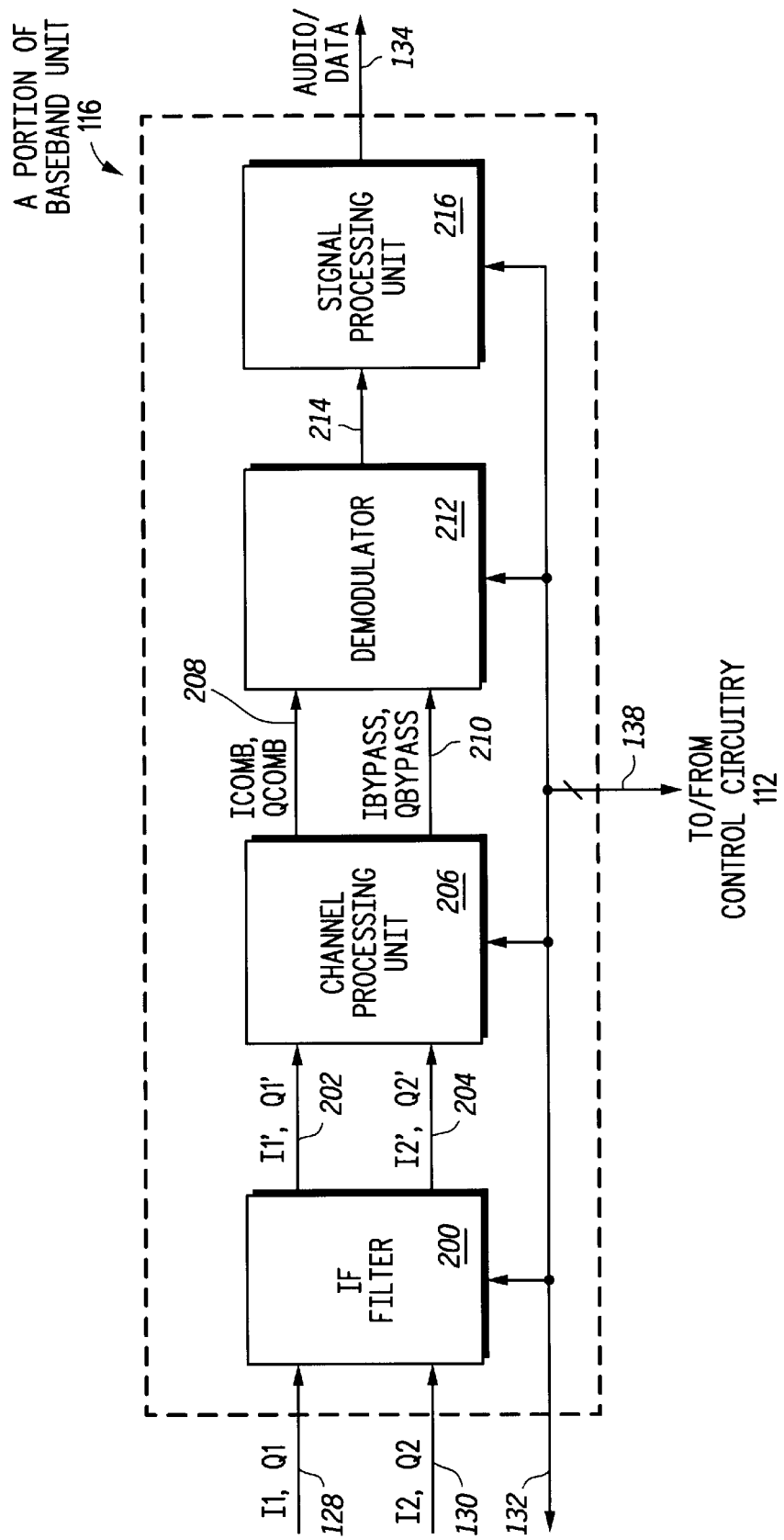
FIG. 2 illustrates, in block diagram form, a portion of a baseband unit of FIG. 1, according to one embodiment of the present invention.
Figure 3:
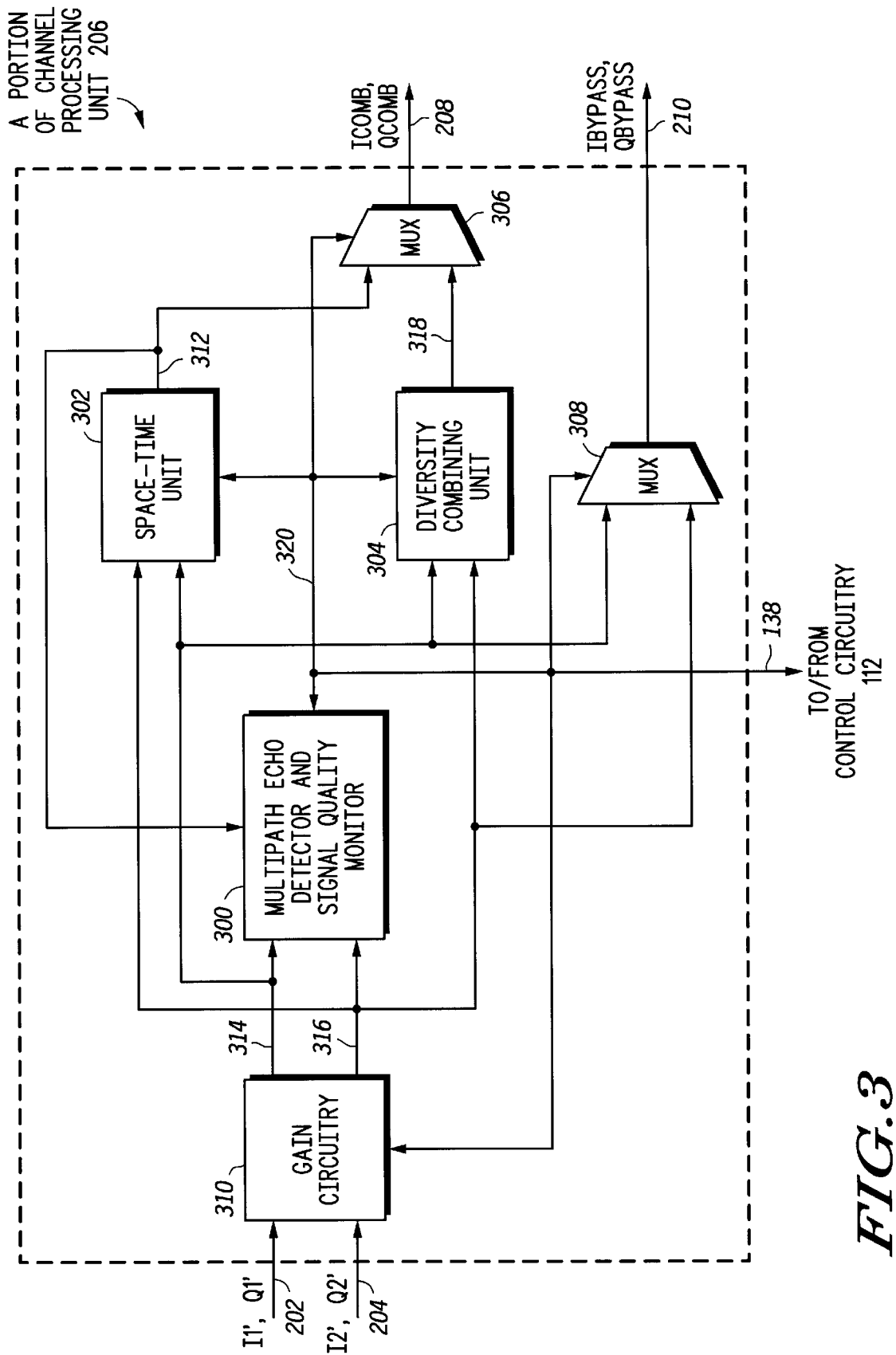
FIGS. 3–4 illustrate, in block diagram form, portions of a channel processing unit of FIG. 1 according to different embodiments of the present invention.
Figure 4:
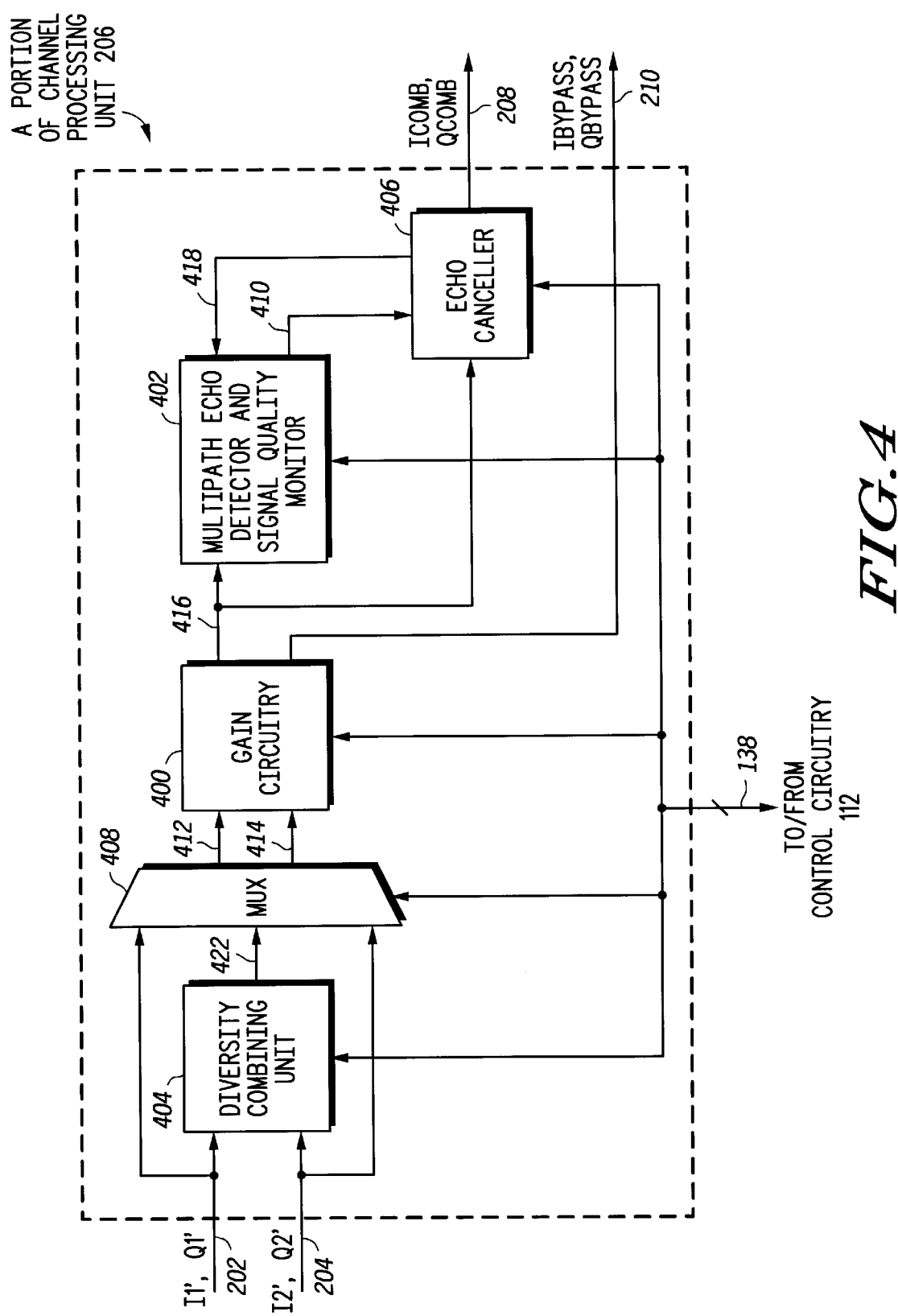
Figure 5:
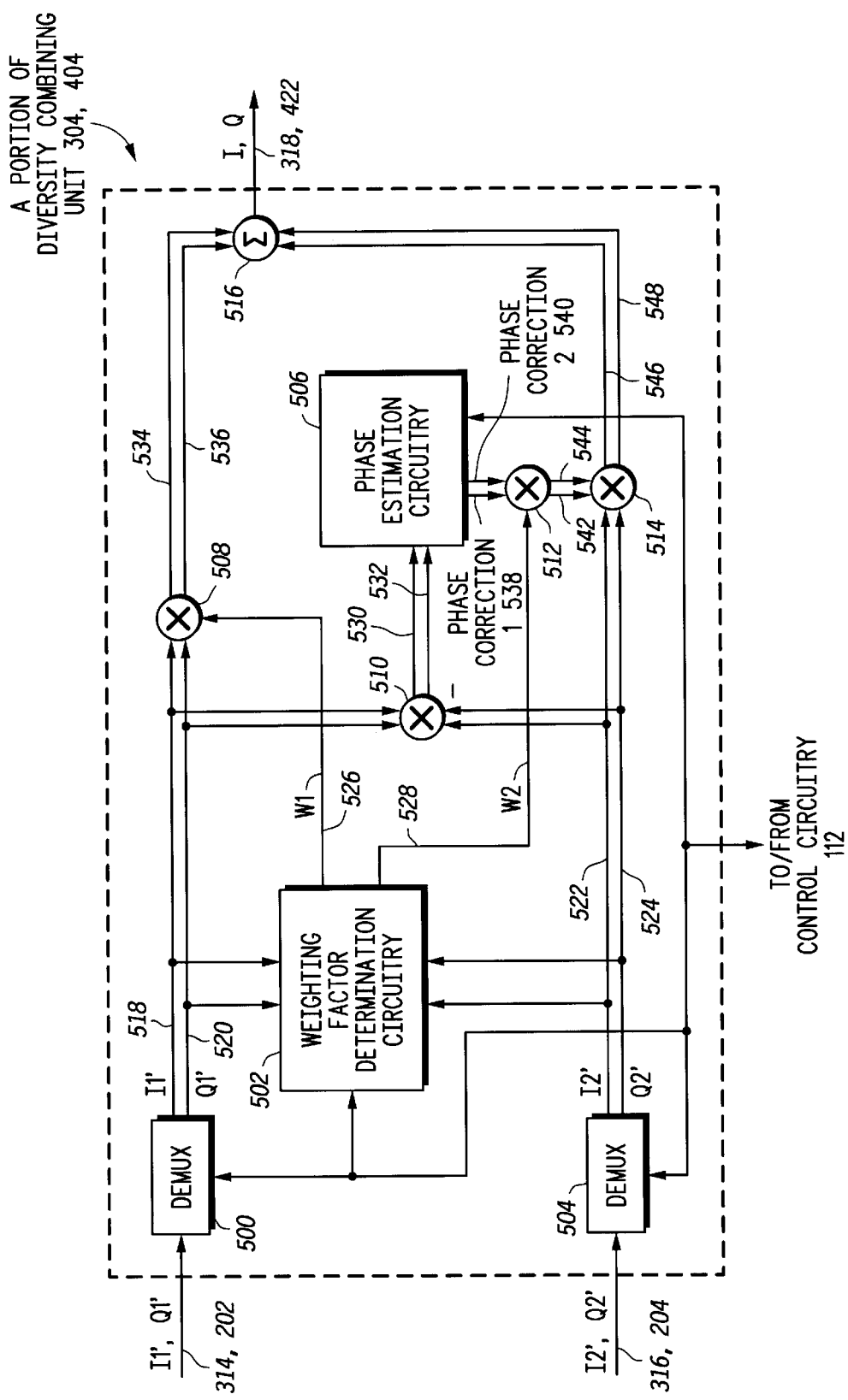
FIG. 5 illustrates, in block diagram form, a portion of a diversity combining unit of FIG. 3 or 4, according to one embodiment of the present invention.
Figure 10:
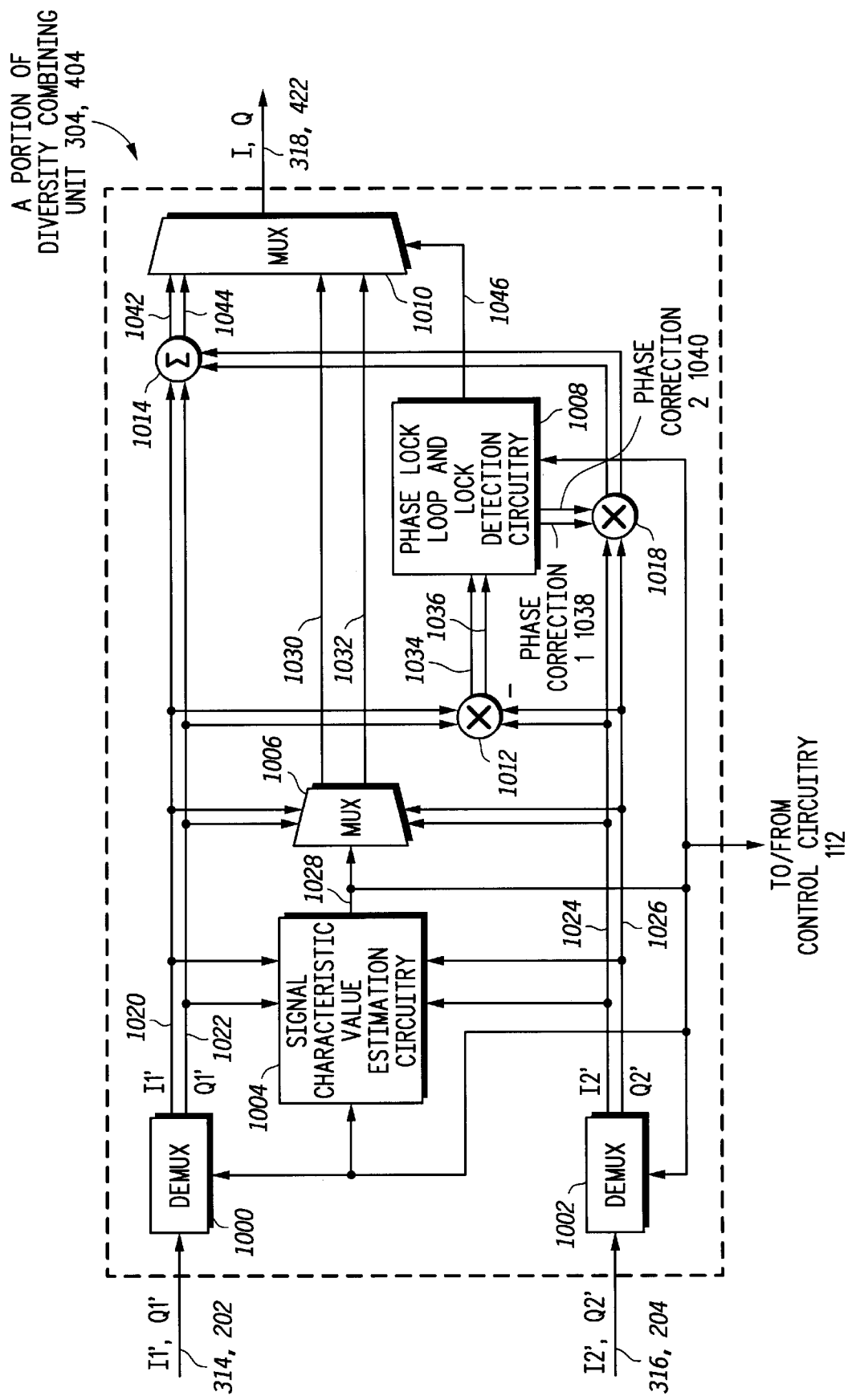
FIG. 10 illustrates, in block diagram form, a portion of the diversity combining unit of FIG. 3 or 4, according to an alternate embodiment of the present invention.

As a brief introductory overview, note that FIG. 1 illustrates one embodiment of a radio receiver having a baseband unit and FIG. 2 illustrates one embodiment of the baseband unit of FIG. 1. FIGS. 3 and 4 provide different embodiments of a channel processing unit (within the baseband unit of FIG. 2). Both embodiments (FIGS. 3 and 4) are capable of calculating or estimating a phase difference between incoming signals prior to combining them. Also, each of the embodiments of FIGS. 3 and 4 provide for the option of echo cancelling which is generally performed when diversity combining of incoming signals is used. This echo cancelling is performed in FIG. 3 by space-time unit 302 and by echo canceller 406 in FIG. 4. Also, both FIGS. 3 and 4 include a diversity combining unit (304, 404) capable of combining a plurality of incoming signals. FIGS. 5 and 10 therefore illustrate alternate embodiments for diversity combining units 304 and 404. FIG. 5 illustrates a phase estimation method for combining signals and FIG. 10 illustrates a hybrid PLL method. Therefore, embodiments of the present invention provide for various different alternatives that may be used within the baseband unit (and generally within the channel processing unit).

FIG. 1 illustrates a radio receiver in accordance with one embodiment of the present invention. Radio receiver 100 includes user interface 110 bi-directionally coupled via conductors 144 to control circuitry 112. Control circuitry 112 is bi-directionally coupled to radio frequency (RF) units 106 and 108 via conductors 142, to intermediate frequency (IF) unit 114 via conductors 140, and baseband unit 116 via conductors 138. RF Unit 106 is coupled to RF antenna 102 via conductor 120 and is bi-directionally coupled to IF unit 114 via conductors 124. RF Unit 108 is coupled to RF antenna 104 via conductor 122 and is bi-directionally coupled to IF unit 114 via conductors 126. IF unit 114 is coupled to base band unit 116 via conductors 128, 130 and 132. Base band unit 116 is coupled to audio processing unit 150 and data processing unit 148 via conductor 134. Audio processing unit 150 is coupled to amplifier and speaker 118 which provides output signals via conductor 136. Data processing unit 148 is bidirectionally coupled to user interface 110. Also, users may provide and receive information to and from user interface 110 via conductors 146.

In operation, RF antennas 102 and 104 capture radio signals and provide them to RF Units 106 and 108, respectively. RF Units 106 and 108 translate the received radio signals to a common intermediate frequency range as dictated by the design of the radio receiver. That is, RF Units 106 and 108 may translate the frequency of the received radio signals to a lower frequency or to a higher frequency depending on the requirements of IF Unit 114. IF unit 114 receives the RF signals via conductors 124 and 126 and digitizes them through the use of an analog to digital converter. IF unit 114 also performs digital mixing to produce in-phase and quadrature digitized signals which are output via conductors 128 and 130 to base band unit 116. In alternate embodiments, IF unit 114 is optional. That is, RF units 106 and 108 may translate the received radio signals from antennas 102 and 104 directly to base band and may include an analog to digital converter to provide the digitized base band signals directly to base band unit 116. (Also note that RF units 106 and 108 and IF unit 114, if used, may be referred to as a "lower frequency unit" or "higher frequency unit" depending on whether the received radio signals need to be translated to a lower or higher frequency, respectively.)

Base band unit 116 receives the digitized radio signals from intermediate frequency unit 114 or, if no IF unit exists, directly from RF units 106 and 108. Base band unit 116 performs signal conditioning, demodulation, and decoding in order to produce audio and data information via conductor 134. The processing performed by base band unit 116 will be further described in reference to later figures. Audio information via conductor 134 may be provided to audio processing unit 150 which may be coupled to amplifier and speaker 118 to produce an audio output from receiver 100 via conductor 136. For example, this may be music played from radio speakers. Alternatively, base band unit 116 may output data information via conductor 134 to data processing unit 148 for further processing. The output of data processing unit 148 may be coupled to user interface 110 to allow user interaction with the output of receiver 100. For example, user interface 110 may represent a radio dial, a touch screen, monitor and keyboard, keypad, or any other suitable input/output device. The data information may represent text, graphics, or any other information transmitted in digital form.

In alternate embodiments, radio receiver 100 may be used for different formats of data such as AM, FM, GPS, digital T.V., T.V., digital/audio broadcast, audio broadcast, digital/video broadcast, or the like. Furthermore, receiver 100 may be designed to receive frequencies other than radio frequencies. Antennas 102 and 104 may therefore be referred to as sensors capable of sensing a variety of data formats. Furthermore, each of the sensors or antennas in the system may receive different formats of data so that, for example, one sensor may receive radio signals while other sensors may receive different types of data as listed above. Also, receiver 100 of FIG. 1 illustrates two sensors or antennas (e.g. antennas 102 and 104); however, alternate embodiments may use any number of sensors for capturing signals or information.

FIG. 2 illustrates one embodiment of a portion of baseband unit 116. IF filter 200 receives in-phase and quadrature signal pairs I1, Q1 and I2, Q2 via conductors 128 and 130, respectively, where I1, Q1 corresponds to the signal received via sensor or antenna 102 and I2, Q2 corresponds to the signal received via sensor or antenna 104. I1 and I2 represent the digitized in-phase signals while Q1 and Q2 represent the digitized quadrature signals (e.g. signals that are 90 degrees out of phase as compared to the in-phase signals). (Note also that each signal such as I1, Q1 and I2, Q2 can be represented as a complex number where I1 and I2 represent the real portions and Q1 and Q2 represent the imaginary portions, as will be discussed further below.) IF filter 200 is coupled to channel processing unit 206 via conductors 202 and 204. Channel processing unit 206 is coupled to demodulator 212 via conductors 208 and 210, and demodulator 212 is coupled to signal processing unit 216 via conductor 214. Signal processing unit 216 provides audio/data information via conductor 134. IF filter 200, channel processing unit 206, demodulator 212, and signal processing unit 216 are coupled to control circuitry 112 via conductors 138. Conductors 138 may be referred to as a control bus including a variety of conductors for transferring different signals to and from units 200, 206, 212 and 216. Conductor 132, for example, may include a subset of conductors 138 or may be the full bus 138 which is provided back to intermediate frequency unit 114. Therefore, control signals received via conductor 138 may be transmitted to IF frequency unit 114 via conductor 132. Likewise, these control signals or subsets of these signals may be transmitted back to the RF units 106 and 108 via conductors 124 and 126. Alternatively, control signals may be sent directly from control circuitry 112 to radio frequency units 106 and 108 via conductor 142.

In operation, IF filter 200 removes unwanted signals and noise from the desired frequency range of incoming signals I1, Q1, and I2, Q2. IF filter 200 also suppresses adjacent channels in order to produce filtered in-phase and quadrature signal pairs I1', Q2', and I2', Q2', where I1', Q1' corresponds to I1, Q1 and I2', Q2' corresponds to I2, Q2. Channel processing unit 206 receives I1', Q1' and I2', Q2' and combines these to produce a single combination signal Icomb, Qcomb. Alternatively, channel processing unit 206 may also provide one of its incoming signals such as I1', Q1' or I2', Q2' directly to demodulator 212 via conductor 210 as Ibypass, Qbypass. Therefore, channel processing unit 206 provides the option of combining its incoming digitized signals or bypassing them directly to further processing units such as demodulator 212. Channel processing unit 206 may also provide both a combined signal such as Icomb, Qcomb and a bypass signal such as Ibypass, Qbypass. Channel processing unit 206 and Ibypass, Qbypass also provide the ability to receive different types of signal formats such that one signal, such as I1', Q1', may be processed by channel processing unit 206 and output via conductor 208 while a second signal, such as I2', Q2', may be a different signal format that is directly bypassed to demodulator 212. (Alternatively, I1', Q1' may be output via conductor 208 without being processed by channel processing unit 206). This allows channel processing unit 206 to provide either a single combination signal or various different signals for further processing. For example, one antenna may provide signals from one radio station while a second antenna may provide signals from a second radio station or of a different data format all together. Channel processing unit 206 may also perform noise canceling on the received signals.

Also note that the embodiment illustrated in FIG. 2 illustrates only two signals received by IF filter 200 and channel processing unit 206. However, as was discussed in reference to FIG. 1, receiver 100 may include any number of antennas such as 102 and 104. In this embodiment, each antenna would provide its own in-phase and quadrature signal pair such as I1, Q1 to IF filter 200. In this embodiment, IF filter 200 may provide a plurality of filtered in-phase and quadrature signal pairs corresponding to each of the antennas. In this manner, channel processing unit 206 may output a single combination signal or multiple subcombinations of signals, as appropriate. Also, channel processing unit 206 may provide multiple bypass signals so that more than one incoming signal may be directly bypassed to further processing units such as demodulator 212.

Demodulator 212 receives signals Icomb, Qcomb and Ibypass, Qbypass from channel processing unit 206 and provides demodulated signals to signal processing unit 216 via conductor 214. Also, if demodulator 212 receives signals Ibypass, Qbypass, demodulator 212 may provide a demodulated Ibypass, Qbypass, also via conductor 214 to signal processing unit 216. However, as discussed above, Ibypass, Qbypass is optional. For example, in one embodiment, demodulator 212 may be an FM demodulator providing multiplex (MPX) signals corresponding to each of its incoming signals (e.g. Icomb, Qcomb and Ibypass, Qbypass). In alternate embodiments, demodulator 212 may be an AM demodulator or a demodulator specific to any other signal format as required by the system (e.g. receiver 100) and incoming signals I1, Q1 and I2, Q2. Signal processing unit 216 may perform further processing on the signals received via conductor 214 and outputs audio/data information via conductor 134. Audio/data information may include just audio information, just data information or a combination of both audio and data information. This data may then be output to various different systems such as data processing systems or audio processing systems, as illustrated in FIG. 1. For example, in an FM receiver, demodulator 212 outputs an MPX signal to signal processing unit 216 as discussed above. In this embodiment, signal processing unit 216 receives the MPX signal and performs stereo decoding in order to provide the proper signals to each speaker. For example, the MPX signal may be decoded utilizing a pilot tone to provide left and right speaker signals in a stereo system. Also, signal processing unit 216 may demodulate other sub-carrier signals (e.g. RDS or DARC) to provide further information to subsequent processing units.

FIG. 3 illustrates, in block diagram form, one embodiment of a portion of channel processing unit 206. Gain circuitry 310 receives I1', Q1' and I2' and Q2' via conductors 202 and 204. Gain circuitry 310 also receives and provides control signals to and from control circuitry 112 via conductors 138. Gain circuitry 310 is coupled to multi-path echo detector and signal quality monitor 300, space-time unit 302, and diversity combining unit 304 via conductors 314 and 316. MUX 308 receives input signals via conductors 314 and 316 and a control signal via conductors 138 and outputs Ibypass, Qbypass via conductor 210. MUX 306 receives input signals via conductors 312 and 318 and a control signal via conductor 320 and outputs Icomb, Qcomb via conductor 208. Conductor 320 may be a subset of conductors 138 or may be a direct control signal received from multipath echo detector and signal quality monitor 300.

In operation, gain circuitry 310 receives I1', Q1', and I2', Q2' and adjusts the signals levels of the incoming signals and provides a gain adjusted (e.g. amplified) version of I1', Q1' via conductor 314 and a gain adjusted (e.g. amplified) version of I2', Q2' via conductor 316. Therefore, in the description related to FIG. 3 and the subparts of FIG. 3, I1', Q1' and I2', Q2' will be referring to the gain adjusted versions of these signals sent via conductors 314 and 316. Multipath echo detector and signal quality monitor 300 receives I1', Q1' and I2', Q2', and determines whether echo cancellation is required. In situations where multipath components (maybe due to unintentional scattering and reflections) of the incoming signals at antennas 102 and 104 introduce too much interference (e.g. echo), the effects may be mitigated prior to outputting the combined signal via conductor 208.

If multipath echo detector and signal quality monitor 300 determines that echo canceling is needed (i.e. that the amount of echo exceeds a predetermined echo threshold), multipath echo detector and signal quality monitor 300 provides a control signal to space-time unit 302 and diversity combining unit 304 to select which processing is performed. For example, in the case where echo canceling is desired, control signal 320 selects the space-time unit 302 to perform the signal processing such that the incoming signals I1', Q1' and I2', Q2' may be properly combined with echo canceling prior to providing it as the output. However, if sufficient echo is not detected, multipath echo detector and signal quality monitor 300, via conductor 320, provides a control signal to diversity combining unit 304 to process the signals I1', Q1' and I2', Q2' to produce a combined output via conductor 318. Diversity combining unit 304 therefore provides a combined signal without echo canceling. The control signal provided by multipath echo detector 300 via conductor 320 also provides a selector signal for MUX 306 to determine whether the output of space-time unit 302 or the output of diversity combining unit 304 is provided as Icomb, Qcomb via conductor 208. Operation of multipath echo detector signal quality monitor will be discussed further in reference to FIG. 16.

In the case where sufficient echo is detected, multipath echo detector and signal quality monitor 300 selects space-time unit 302, as discussed above. The output of space-time unit 302 provided via conductor 312 is fed back to multipath echo detector and signal quality monitor 300 to determine whether the signal quality is sufficient (signal quality may be considered sufficient if the amount of echo detected is below the predetermined echo threshold.) If not, a subsequent iteration is performed where once again the output is fed back to multipath echo detector and signal quality monitor 300. Operation of space-time unit 302 will be discussed in further detail in reference to FIG. 15. Once the signal is determined to be of sufficient quality, i.e. below the predetermined echo threshold, multipath echo detector and signal quality monitor 300 asserts the control signal via conductor 320 to MUX 306 in order to select output 312 to be provided as Icomb, Qcomb. The iterations therefore continue until sufficient echo canceling has been performed.

FIG. 4 illustrates a portion of channel processing unit 206 according to an alternate embodiment of the present invention. The portion of channel processing unit 206 of FIG. 4 includes gain circuitry 400, multipath echo detector and signal quality monitor 402, diversity combining unit 404, echo canceller 406 and MUX 408. Diversity combining unit 404 and MUX 408 receive I1', Q1' and I2', Q2' via conductors 202 and 204. Diversity combining unit 404 provides a combined signal via conductor 422 to MUX 408. Gain circuitry 400 provides a gain adjusted signal, via conductor 416, to multipath echo detector and signal quality monitor 402. MUX 408 receives a control signal from control circuitry 112 and either provides I1', Q1' via conductor 412 and I2', Q2' via conductor 414 or a combined signal from 422 to conductor 412. In the latter case, either no signal is provided to conductor 414, or, in alternate embodiments, one of I1', Q1' and I2', Q2' can be provided to conductor 414 in addition to a combined signal. Gain circuitry is also coupled to echo canceller 406 via conductor 416. Multipath echo detector and signal quality monitor 402 is coupled to echo canceller 406 via conductors 410 and 418. Echo canceller 406 provides output Icomb, Qcomb via conductor 208 and gain circuitry 400 provides output Ibypass, Qbypass via conductor 210. Conductors 138 provide control signals to and from control circuitry 112 to gain circuitry 400, multipath echo detector and signal quality monitor 402, diversity combining unit 404, echo canceller 406, and MUX 408. (Note that in the embodiment of FIG. 4, unlike the embodiment of FIG. 3, diversity combining unit 404 does not receive the gain adjusted inputs corresponding to I1', Q1' and I2', Q2'.) In operation, I1', Q1' may either be combined or processed separately through channel processing unit 206. In the former case, diversity combining unit 404 receives signals I1', Q1' and I2', Q2' via conductors 202 and 204 and combines them to provide a combined signal via conductor 422 through MUX 408 to gain circuitry 400, via conductor 412. Gain circuitry 400 provides a gain adjusted combination of I1', Q1' and I2', Q2', via conductor 416 to multipath echo detector 402. Multipath echo detector 402 determines whether the multipath components at antennas 102 and 104 caused an echo of greater than a predetermined echo threshold value. If the echo exceeds this predetermined threshold, multipath echo detector 402 enables echo canceller 406 via conductor 410 to perform echo canceling on the signal received from gain circuitry 400 via conductor 416. The signal at the output of echo canceller 406 is fed back to multipath echo detector 402 via conductor 418. Multipath echo detector and signal quality monitor 402 determines whether echo canceller 406 canceled sufficient echo to lower the echo below the predetermined echo threshold. If the echo level is below the predetermined threshold then the signal quality is sufficient and echo canceller 406 outputs the combined signal Icomb, Qcomb via conductor 208. However, if the echo still surpasses the predetermined threshold, the signal is iteratively processed through echo canceller 406 until the signal is determined to be of sufficient signal quality (e.g. below the predetermined echo threshold) by multipath echo detector and signal quality monitor 402. If sufficient, echo canceller 406 outputs the final signal Icomb, Qcomb via conductor 208.

Echo canceller 406 may use any method of echo canceling to provide signal Icomb, Qcomb. For example, in the case of an FM radio signal, requiring constant amplitude, a constant modulus algorithm (CMA) is suitable for use in echo canceller 406. That is, echo canceller 406 is an adaptive signal processing unit used to perform echo canceling. Alternate embodiments may use least means square echo canceling (LMS), recursive least square echo canceling (RLS), or any other appropriate algorithm. Therefore, depending upon the signals being processed, a variety of echo cancellers may be used.

If I1', Q1' and I2', Q2' are not to be combined, I1', Q1' and I2', Q2' are provided to MUX 408 (bypassing diversity combining unit 404) via conductors 202 and 204. A control signal is coupled to MUX 408 via the control signals coming to and from control circuitry 112. Therefore, if either one of the signals, I1', Q1' or I2', Q2' are needed uncombined, MUX 408 outputs one of I1', Q1' and I2', Q2' to conductor 412 and the other one of I1', Q1' and I2', Q2' to conductor 414. Both signals each get gain adjusted and output to conductors 416 and 210. Conductor 416 goes through echo canceller 406 (which, in this case, is disabled by the control signal via conductor 410) and is output as Icomb, Qcomb via conductor 208. The other output of gain circuitry 400 provides the output Ibypass, Qbypass via conductor 210. Therefore, if no combination of signals is required, gain adjusted I1', Q1' is output as either Icomb, Qcomb and Ibypass, Qbypass, and gain adjusted I2', Q2' is output as the other one of Icomb, Qcomb and Ibypass, Qbypass. This allows the option for one or more signals to bypass diversity combining unit 404. As discussed above, this is useful in the case where different types or ranges of signals are desired. In this embodiment, both Icomb, Qcomb and Ibypass, Qbypass are uncombined signals. Alternatively, though, an uncombined signal (e.g. I1', Q1' or I2', Q2') can be provided as either Icomb, Qcomb or Ibypass, Qbypass. That is, both signals do not need to be transmitted if only one signal is desired. In yet another embodiment, a combined signal can be provided as Icomb, Qcomb and a single (uncombined) signal (e.g. I1', Q1' or I2', Q2') can be provided as Ibypass, Qbypass. A bypass signal in the embodiments of FIGS. 3 and 4 can therefore be used to selected whether an output of channel processing unit 206 is a combined or uncombined signal. This bypass signal may be, for example, the control signals of MUX 308 and MUX 408. Thus, in one embodiment, the bypass signal may be generated within control circuitry 112. However, alternate embodiments may generate and utilize a bypass signal or a plurality of bypass signals in a variety of different ways.

FIG. 5 illustrates a portion of the diversity of combining units 304 and 404 of FIGS. 3 and 4, respectively, according to one embodiment of the present invention. Therefore, the circuitry of FIG. 5 may be used in either embodiment illustrated in FIG. 3 and FIG. 4, or in any other embodiment, as appropriate. Note that if the circuitry of FIG. 5 is used in the embodiment of FIG. 3, I1', Q1' and I2', Q2' refer to the gain adjusted versions of the signals; however, if the circuitry of FIG. 5 is used in the embodiment of FIG. 4, I1', Q1' and I2', Q2' do not refer to the gain adjusted versions of the signals since gain circuitry 400 is coupled downstream to diversity combining unit 404. FIG. 5 includes demultiplexers (DEMUX) 500 and 504, weighting factor determination circuitry 502, multipliers 508, 510, 512, and 514, summer 516, and phase estimation circuitry 506. DEMUX 500 is coupled to weighting factor determination circuitry 502, multiplier 508, and multiplier 510 via conductors 518 and 520. DEMUX 504 is coupled to weighting factor determination circuitry 502, multiplier 510, and multiplier 514 via conductors 522 and 524. Weighting factor determination circuitry 502 provides WI via conductor 526 to multiplier 508 and W2 via conductor 528 to multiplier 512. Phase estimation circuitry 506 is coupled to multiplier 510 via conductors 530 and 532, and provides phase correction 1 via conductor 538 and phase correction 2 via conductor 540 to multiplier 512 which is coupled to multiplier 514 via conductors 542 and 544. Summer 516 is coupled to multiplier 508 via conductors 534 and 536 and to multiplier 514 via conductors 546 and 548. Summer 516 provides the output I, Q via conductor 318 or 422, depending on the embodiment. DEMUX 500 receives I1', Q1' via conductor 314 or 414, depending on the embodiment, and DEMUX 504 receives I2', Q2' via conductor 316 or 416, depending on the embodiment.

In operation, DEMUX 500 receives I1', Q1' via conductor 314 or 202, depending on the embodiment, and outputs I1' via conductor 518 and Q1' via conductor 520. Note that I1' is representative of the real portion of the complex signal, while Q1' is representative of the imaginary portion of the complex signal. That is, Q1' is 90° out of phase with I1'. Likewise, DEMUX 504 receives I2', Q2' via conductor 316 or 204 depending upon the embodiment, and outputs I2' via conductor 522 and Q2' via conductor 524. As above, I2' is representative of the real portion of the complex signal I2', Q2', and Q2' is representative of the imaginary portion of the complex signal. (Note that each signal, such as I1', Q1' and I2', Q2', may be written in the form of a complex number, e.g. I1'+jQ1' and I2'+jQ2', respectively.)

I1', Q1', I2', and Q2' are provided to weighting factor determination circuitry 502 which computes a weighting factor based on, for example, amplitude or power, for each incoming signal, I1', Q1' and I2', Q2'. This circuitry will be explained further in reference to FIGS. 7 and 17. Weighting factor determination circuitry 502 therefore outputs W1 (a weighting factor for I1', Q1') via conductor 526 to multiplier 508 and W2 (a weighting factor for I2', Q2') to multiplier 512 via conductor 528. Weighting factor determination circuitry 502 determines weighting factors W1 and W2 based upon a signal characteristic corresponding to at least one of I1', Q1' and I2', Q2'. Alternate embodiments may determine W1 and W2 based upon the signal characteristic corresponding to both I1', Q1' and I2', Q2'. The signal characteristic may refer to the amplitude, power, or any other appropriate characteristic of the signal. Furthermore, any combination of signal characteristics may be used to determine the weighting factors. Multiplier 510 receives both I1', Q1' and I2', Q2' and multiplies I1', Q1' by the complex conjugate of I2', Q2'. This computation can extract the phase difference information between these two signals and pass it to phase estimation circuitry 506 via conductors 530 and 532.

Phase estimation circuitry 506 calculates the difference in phase between signal I1', Q1' and I2', Q2' using I1', Q1' as a reference. The phase difference is then output as phase correction 1 via conductor 538 to multiplier 512 and phase correction 2 via conductor 540 to multiplier 512. This phase difference is scaled by W2 via connector 528 and provided to multiplier 514 via conductors 542 and 544. Multiplier 514 receives I2', Q2' via conductors 522 and 524 and multiplies it by the result of multiplier 512. Therefore, the output of 514 is provided to summer 516 via conductors 546 and 548. Multiplier 508 multiplies I1', Q1' by W1, thus using a signal characteristic such as power or amplitude of the signal as a scaling factor. The result of multiplier 508 is supplied to summer 516 via conductors 534 and 536. Therefore, the final combined signal, I, Q, is provided via conductors 318 or 422, depending upon the embodiment. The equations and calculations can be better understood in reference to the flow diagram of FIG. 6.

Figure 6:
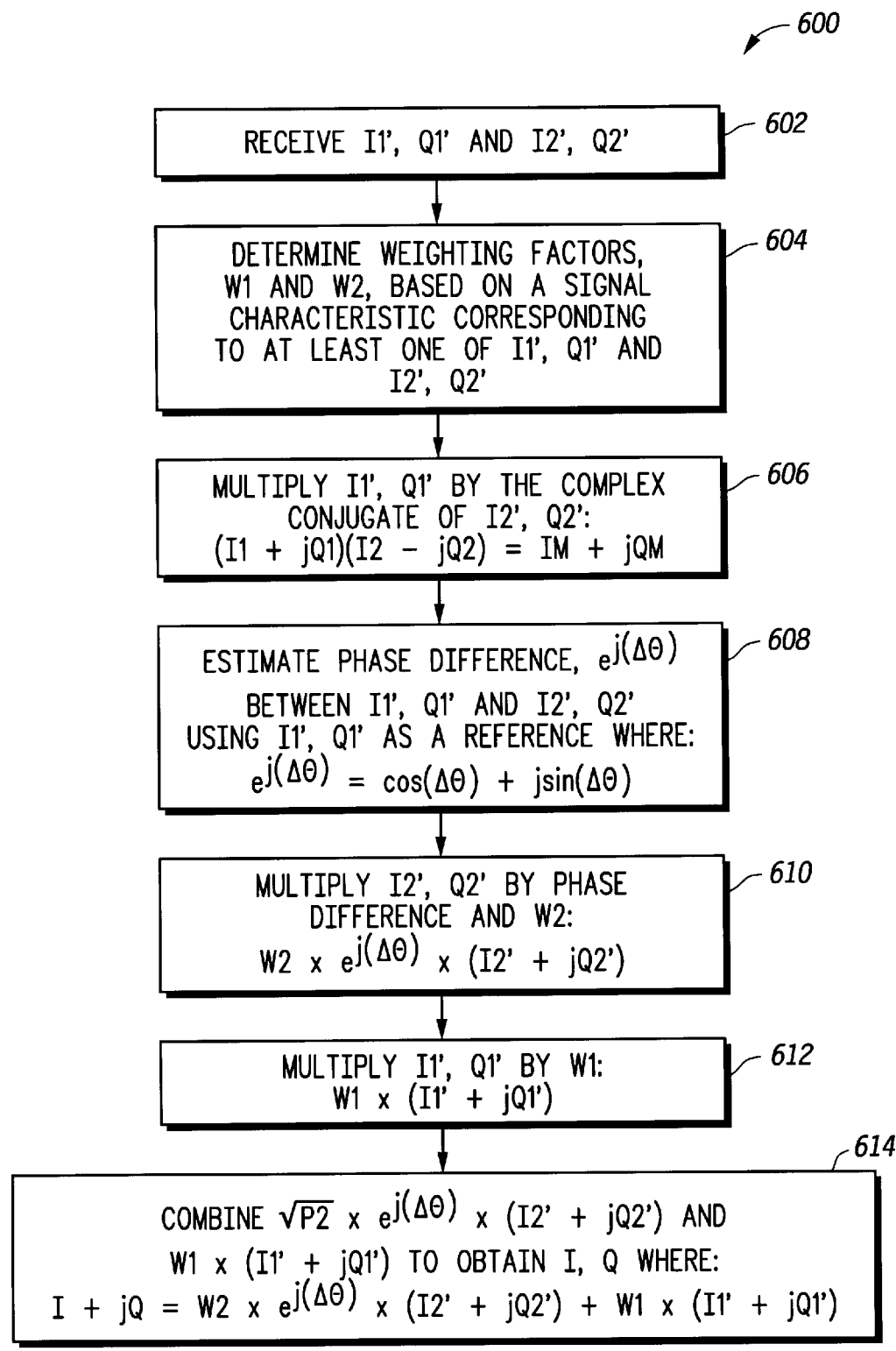
FIG. 6 illustrates, in flow diagram form, operation of the diversity combining unit of FIG. 5 in accordance with one embodiment of the present invention.

FIG. 6 illustrates operation of the diversity combining unit 304, 404 of FIG. 5, according to one embodiment of the present invention. In block 602, I1', Q1' and I2', Q2' are received. In block 604, weighting factors W1 and W2 are determined based on at least one signal characteristic corresponding to at least one of I1', Q1' and I2', Q2'. For example, in one embodiment, power may be selected as the signal characteristic used to determine W1 and W2 where W1 may be equal or proportional to the square root of power of I1', Q1' and W2 may be equal or proportional to the square root of power of I2', Q2'. Note that in one embodiment, the power or amplitude is calculated based on the combined effect of the useful signal and the system noise, and no attempt is made to separate the noise effect from the useful signal. In the embodiment of FIG. 6, weighting factor determination circuitry 502 may estimate the power (p1) of I1', Q1' and the power (p2) of I2', Q2' where W1=$\sqrt{p1}$ and W2=$\sqrt{p2}$. Alternatively, the amplitude may be selected where W1 and W2 are functions of the amplitude of I1', Q1' or I2', Q2' or both. Therefore, in this embodiment, weighting factor determination circuitry 502 may estimate the amplitudes of I1', Q1' (AMP1) and I2', Q2' (AMP2). (The use of amplitude as the signal characteristic will be described further below in reference to FIGS. 17 and 18.

Referring to FIG. 6, in block 606, I1', Q1' is multiplied by the complex conjugate of I2', Q2'. This may be performed by multiplier 510. The calculation can be represented as follows:

$$(I1'+jQ1')\cdot(I2'-jQ2')=IM+jQM \qquad \text{Equation 1}$$

In the above equation, the phase of the resulting IM, QM signal can be written in the form of $e^{j(\theta 1-\theta 2)}=e^{j\Delta\theta}$ where $e^{j\theta 1}$ represents the phase of I1', Q1', $e^{j\theta 2}$ represents the phase of I2', Q2', and $e^{j\Delta\theta}$ represents the phase difference between I1', Q1' and I2', Q2' which can further be represented as:

$$e^{j\Delta\theta}=\cos(\Delta\theta)+j\sin(\Delta\theta) \qquad \text{Equation 2}$$

Therefore, in block 608 the phase difference, $e^{j\Delta\theta}$, is estimated where the output of phase estimation circuitry 506 of FIG. 5 may be represented as two signals: phase correction 1 represented as $\cos(\Delta\theta)$ and phase correction 2 represented as $\sin(\Delta\theta)$ (where phase correction 1 represents the real portion and phase correction 2 represents the imaginary portion of the phase difference).

In block 610, I2', Q2' is multiplied by the phase difference and W2, to obtain the result as shown below in Equation 3. (This calculation may be performed by multiplier 512.)

$$W2 \cdot e^{j\Delta\Theta} \cdot (I2'+jQ2') \qquad \text{Equation 3}$$

In block 612, I1', Q1' is multiplied by W1 to obtain the result as shown below in Equation 4. (This calculation may be performed by multiplier 508.)

$$W1 \cdot (I1'+jQ1') \qquad \text{Equation 4}$$

Therefore, in Equations 3 and 4, W1 and W2 function as weighting factors for each corresponding signal, I1',Q1' and I2',Q2', respectively, where W1 and W2 can be based on a signal characteristic such as power or amplitude. In block 614, the results of blocks 610 and 612 are combined to obtain the final combined signal I, Q (which may be written in the form of I+jQ). This final calculation may be performed by summer 516, where summer 516 provides the output I, Q via conductor 318 or 422, depending on the embodiment of channel processing unit 206. The equation is therefore as follows:

$$I+jQ = W2 \cdot e^{j\Delta\Theta} \cdot (I2'+jQ2') + W1 \cdot (I1'+jQ1') \qquad \text{Equation 5}$$

Referring to equation 5 above, the first term in the equation, $W2 \cdot e^{j\Delta\Theta} \cdot (I2'+jQ2')$, is representative of I2', Q2', phase shifted by the phase difference between I1', Q1' and I2', Q2', and weighted by W2. The second term in the equation, $W1 \cdot (I1'+jQ1')$, is representative of the I1', Q1', weighted by its weighting factor, W1. In alternate embodiments, no weighting factor may be used. Therefore, equation 5 would not include the two weighting factors, W1 and W2, and the diversity combining unit may not include weighting factor determination circuitry 502, or multipliers 508 and 512. Alternatively, other weighting factors other than the signal powers or amplitudes may be used, as appropriate.

Figure 7:
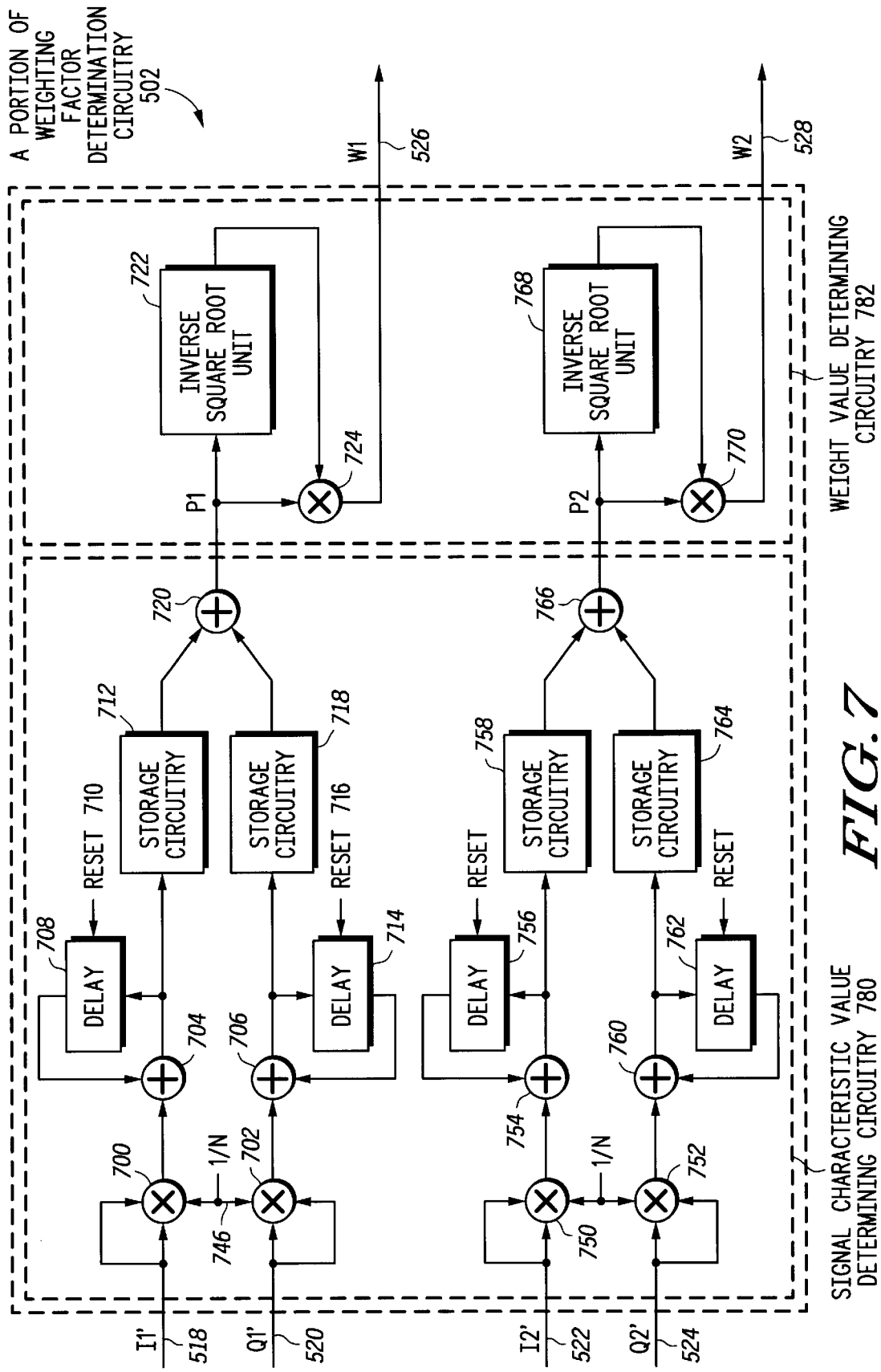
FIG. 7 illustrates, in block diagram form, a portion of weighting factor determination circuitry of FIG. 5, according to one embodiment of the present invention.

FIG. 7 illustrates one embodiment of a portion of weighting factor determination circuitry 502 of FIG. 5. The circuitry will be described in reference to inputs I1' and Q1', where the same explanation and circuitry can apply to inputs I2', Q2'. Also note that in alternate embodiments, the circuitry used for receiving I1' and Q1' may be shared for inputs I2' and Q2' in a time multiplexed manner, or the full circuitry (or portions thereof) may be duplicated, as illustrated in FIG. 7. The portion of weighting factor determination circuitry 502 corresponding to I1', Q1' and the portion corresponding to I2', Q2', in the embodiment illustrated, operate in the same manner. In general, weighting factor determination circuitry 502 includes signal characteristic value determining circuitry and weight value determining circuitry. The former calculates the value of the signal characteristic itself such as the power or amplitude of each signal, and the latter uses the value or values of the signal characteristic to calculate W1 and W2.

In reference to inputs I1' and Q1', weighting factor determination circuitry 502 includes multiplier 700 coupled to receive I1' via conductor 518 and 1/N via conductor 746. Multiplier 702 is coupled to receive Q1' via conductor 520 and 1/N via conductor 746. Multiplier 700 is coupled to adder 704, which is coupled to delay unit 708 and storage circuitry 712. Multiplier 702 is coupled to adder 706, which is coupled to delay unit 714 and storage circuitry 718. Adder 720 is coupled to storage circuitries 712 and 718, inverse square root unit 722, and multiplier 724. Adder 720 therefore provides the power, p1, of I1', Q1' to inverse square root unit 722 and multiplier 724. Inverse square root unit 722 is coupled to multiplier 724, and multiplier 724 provides the output WI via conductor 526. In reference to inputs I2', Q2', weighting factor determination circuitry 502 includes multipliers 750, 752, and 770, adders 754, 760, and 766, delay units 756 and 762, storage circuitries 758 and 764, and inverse square root unit 768, coupled in the same manner as multipliers 700, 702, and 720, adders 704, 706, and 720, delay units 708 and 714, storage circuitries 712 and 718, and inverse square root unit 722, respectively. Therefore, signal characteristic value determining circuitry 780 includes the circuitry between and including multipliers 700, 702, 750, and 752 and adders 720 and 766, as illustrated in FIG. 7. Weight value determining circuitry 782 includes multipliers 724 and 770 and inverse square root units 722 and 768.

In operation, the output of multiplier 700 provides the value $I1'^2/N$ to adder 704 where N represents the number of samples or the window size for collecting values of the incoming signal over time. Likewise, the output of multiplier 702 provides the value $Q1'^2/N$ to adder 706. Adder 704 and delay unit 708 function as an accumulator to accumulate values of $I1'^2/N$ over time. Delay unit 708 receives reset signal 710 which resets delay unit 708 according to a fraction of the sampling frequency, Fs/N, of I1', Q1'. Prior to resetting delay unit 708, storage circuitry 712 stores the accumulated value and provides this value to adder 720. Similarly, adder 706 and delay unit 714 function as an accumulator to accumulate values of $Q1'^2/N$ over time. Delay unit 714 receives reset signal 716 which resets delay unit 714 according to Fs/N. Prior to resetting delay unit 714, storage circuitry 718 stores the accumulated value and provides this value to adder 720. Therefore, reset signals 710 and 716 are generally asserted at the same rate, corresponding to Fs/N, and likewise, the storage circuitries 712 and 718 are clocked at a same rate, corresponding to reset signals 710 and 716, so as to capture the accumulated values over time. Therefore, N can be adjusted as appropriate in order to vary the window size (i.e. the number of samples taken) for accumulating values.

Adder 720 combines the accumulated values of $I1'^2/N$ from storage circuitry 712 and the accumulated values of $Q1'^2/N$ from storage circuitry 718 to obtain p1:

Equation 6:

$$p1 = \sum_{k=j-N}^{j}\left(\frac{II_k'^2}{N} + \frac{Q_k'^2}{N}\right) = \overline{II'^2} + \overline{QI'^2}$$

In equation 6 above, j is the discrete sample number relative to Fs. Therefore, the value of p1 is calculated every Fs/N. This result, p1, is provided to multiplier 724 and inverse square root unit 722. The result of inverse square root unit 722 is shown below in equation 7 below. Inverse square root unit 722 may be implemented in various way, e.g. hardware circuitry that performs the calculation, a state machine embedded in memory, software routines, etc.

Equation 7:

$$\frac{1}{\sqrt{p1}} = \frac{1}{\sqrt{\overline{II'^2} + \overline{QI'^2}}}$$

This result is provided to multiplier 724, which multiplies the output of adder 720 (equation 6) by the output of inverse square root unit 722 (equation 7) to obtain the output, W1, as illustrated by the following equation:

Equation 10:
$$W1 = \sqrt{p1} = \sqrt{I1'^2 + Q1'^2}$$

The same equations (equations 6–8) apply to I2', Q2' where each occurrence of I1' is replaced with I2', each occurrence of Q1' is replaced with Q2', and each occurrence of p1 is replaced with p2. Therefore, W2 can be expressed as follows:

Equation 9:
$$W2 = \sqrt{p2} = \sqrt{I2'^2 + Q2'^2}$$

Therefore, equations 6–9 describe one example of the calculation used in obtaining a power for an incoming signal. Alternate embodiments may perform different calculations, or utilize different circuitry or software than the embodiment illustrated in reference to FIG. 7.

FIG. 17 illustrates an alternate embodiment of weighting factor determination circuitry 502 that uses amplitude to determine W1 and W2. Therefore, FIG. 17 may be used in place of FIG. 7 within weighting factor determination circuitry 502, depending upon the embodiment being used (e.g. whether power or amplitude is being used as the signal characteristic). FIG. 17 includes signal characteristic value determining circuitry 1716 which includes amplitude determination circuitry 1700 and amplitude determination circuitry 1702. Amplitude determination circuitry 1700 receives I1' and Q1' via conductors 518 and 520, respectively, and amplitude determination circuitry 1702 receives I2' and Q2' via conductors 522 and 524, respectively. Amplitude determination circuitry 1700 provides AMP1 to multiply accumulate circuitry 1708, and amplitude determination circuitry 1702 provides AMP2 to multiply accumulate circuitry 1708. Control circuitry 1704 and shift circuitry 1710 are bidirectionally coupled to multiply accumulate circuitry 1708. Multiply accumulate circuitry 1708 provides W1 via conductor 1712 and W2 via conductor 1714. Weight value determining circuitry 1718 therefore includes control circuitry 1704, multiply accumulate circuitry 1708, and shift circuitry 1710.

In operation, amplitude determination circuitry 1700 receives I1' and Q1' and outputs the amplitude, AMP1, of the signal. The amplitude may be calculated using standard methods available today, such as by using a square root approximation of the summation of the $I1'^2$ and $Q1'^2$ signals. Likewise, amplitude determination circuitry 1702 receives I2' and Q2' and outputs the amplitude, AMP2, of the signal. This amplitude may be calculated in the same way as described previously. Multiply accumulate circuitry 1708 receives AMP1 and AMP2 and produces the weighting factors W1 and W2, as will be described below in reference to FIG. 18. Multiply accumulate circuitry 1708 also includes storage circuitry for storing any necessary temporary values. Control circuitry 1704 and shift circuitry 1710 provide and receive control signals to and from multiply accumulate circuitry 1708. Control circuitry 1704, multiply accumulate circuitry 1708, and shift circuitry 1710 may implement a portion of a state machine to perform the calculations that will be discussed in reference to FIG. 18.

FIG. 18 illustrates, in flow diagram form, one embodiment for calculating W1 and W2 based on the amplitudes of I1', Q1' and I2', Q2'. Flow 1800 begins at block 1802, where I1', Q1' and I2', Q2' are received. Flow proceeds to decision diamond 1804 where it is determined whether the amplitude, AMP1, of I1', Q1' is greater than the amplitude, AMP2, of I2', Q2'. If so, flow continues to block 1813 where AMP1 and AMP2 may be optionally scaled. Flow then continues to block 1814 where W1 is set to a predetermined value. The predetermined number represents the default value used for W1. Therefore, in one embodiment, the predetermined value is less than or equal to 0.5. Using a predetermined value of less than or equal to 0.5 ensures that the amplitude of the final combined signal (i.e. I1', Q1' combined with I2', Q2') does not exceed the value of 1. Flow then continues to block 1816 where the inverse of the amplitude, 1/AMP1, is determined. This can be performed using standard techniques such as, for example, a lookup table. In block 1818, W2 is calculated as one half the ratio of AMP2 to AMP1 (see equation 1 above). Note that the 0.5 illustrated in this equation is the predetermined value discussed above; therefore, if a different value is chosen, such as, for example, 0.4, then the 0.5 would be replaced with the 0.4.

If at decision diamond 1804, AMP1 is not greater than AMP2, flow proceeds to block 1805 where AMP1 and AMP2 are optionally scaled. Flow proceeds to block 1806, W2 is set to a predetermined value that is generally less than or equal to 0.5, such as, for example, 0.5. This predetermined value is as described above in reference to block 1814. Flow then continues to block 1808 where the inverse of the amplitude, 1/AMP2, is determined. As above, this can be performed using standard techniques such as a lookup table. In block 1810, W1 is calculated as one half the ratio of AMP1 to AMP2 (see equation 2 above). Note once again that the 0.5 illustrated in this equation is the predetermined value discussed above with reference to block 1806; therefore, if a different value is chosen, this different value would be used in place of the 0.5. Therefore, alternate embodiments may utilize other ratios between AMP1 and AMP2 to determine W1 and W2. Also, alternate embodiments may first scale the amplitudes (e.g. AMP1 and AMP2) using scaling factors prior to performing the calculations to determine the weighting factors such as W1 and W2 (e.g. see optional blocks 1805 and 1813). However, the scaling factors are optional or, alternatively, may be set to one. Therefore, the weighting factors may be expressed as follows:

If AMP1>AMP2:

$$W1 = 0.5 \qquad\qquad \text{Equation 10a}$$

Equation 11a:
$$W2 = AMP2 \cdot 0.5 \cdot \frac{1}{AMP1}$$

If AMP1<AMP2:

$$W2 = 0.5 \qquad\qquad \text{Equation 10b}$$

Equation 11b:
$$W1 = AMP1 \cdot 0.5 \cdot \frac{1}{AMP2}$$

Note that the weighting factors such as W1 and W2 may be functions of only one signal each or of any combination of signals. Also, many different weighting factors may be used other than those here. For example, in systems available today, only signal to noise (SNR) ratios are used as weighting factors. However, using the SNR approach is costly in terms of circuitry and thus increases the price of the system. Furthermore, the weighting factors within those systems using the SNR approach are complex numbers (i.e. they depend upon the phase of the signals). However, embodiments of the present invention do not utilize the SNR to determine the weighting factors but instead utilize other signal characteristics such as amplitude, power, etc., to achieve a more cost effective solution. Also, the weighting factors discussed herein (W1 and W2) are scalar factors. That is, they are independent of phase. They are capable of being independent of phase because a phase calculation or estimation is performed separately and used along with the scalar weighting factors to combine the incoming signals, as will be explained in more detail below. As discussed above, alternate embodiments may include more than just two incoming signals and may therefore have more than two weighting factors which may also depend on one or more signal characteristics. In some embodiments, these weighting factors may also be optional. For example, only some of the incoming signals may use weighting factors.

Figure 8:
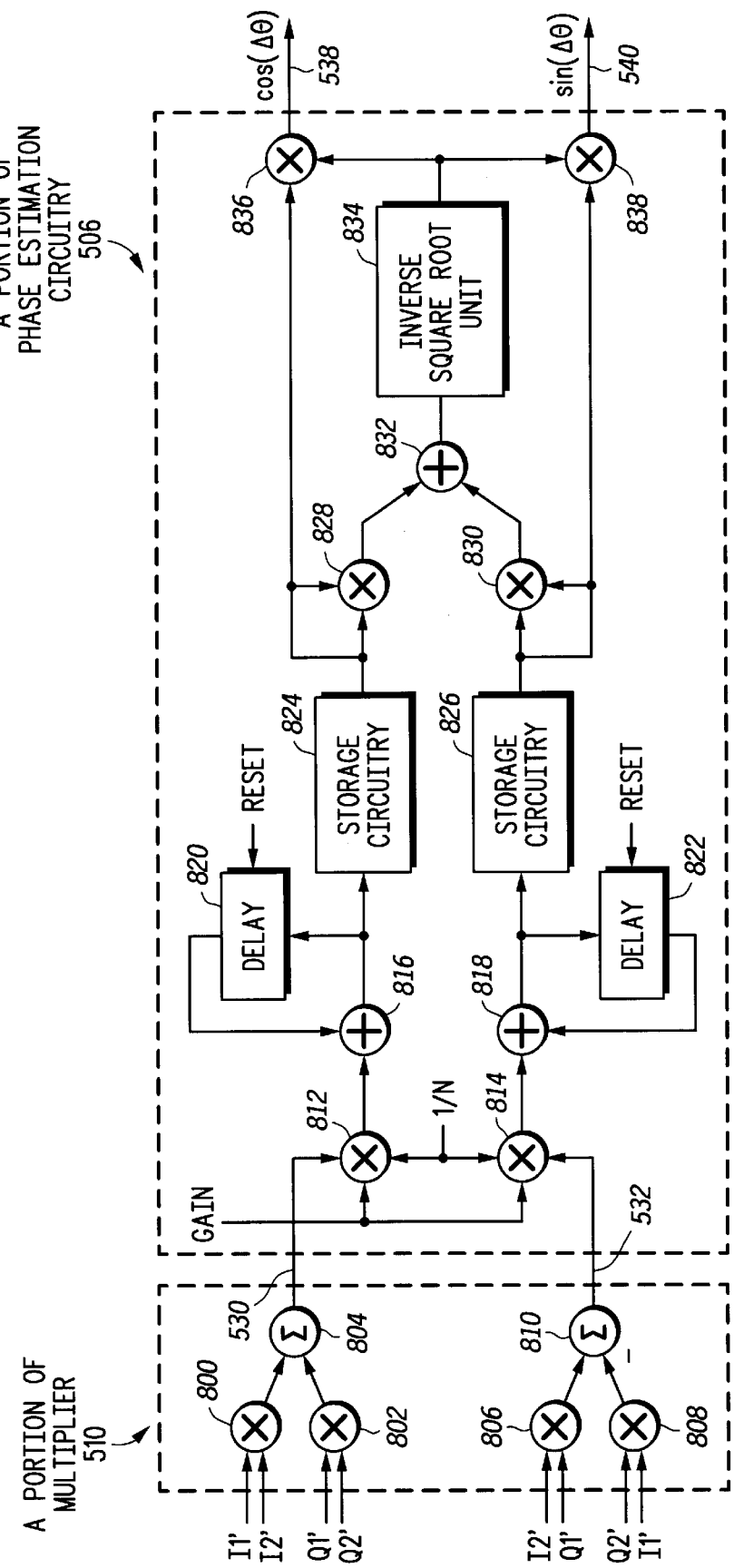
FIG. 8 illustrates, in block diagram form, a portion of phase estimation circuitry of FIG. 5, according to one embodiment of the present invention.

FIG. 8 illustrates a portion of multiplier 510 and a portion of phase estimation circuitry 506. Multiplier 510 includes multiplier 800 and multiplier 802 coupled to summer 804 which is coupled to multiplier 812. Multiplier 510 further includes multiplier 806 and multiplier 808 coupled to summer 810 which is coupled to multiplier 814. Multiplier 812 is coupled to multiplier 814 and adder 816 and receives the inputs 1/N and gain 801. Adder 816 is coupled to delay unit 820 and storage circuitry 824, and multiplier 814 is coupled to adder 818 which is coupled to delay unit 822 and storage circuitry 826. Storage circuitry 824 is coupled to multiplier 828, and storage circuitry 826 is coupled to multiplier 830. Multipliers 828 and 830 are provided as inputs to adder 832 which is coupled to inverse square root unit 834. Storage circuitries 824 and 826 and inverse square root unit 834 are coupled to multipliers 836 and 838. Multiplier 836 provides output representative of cos(Δθ) via conductor 538 and multiplier 838 provides output to representative of sin(Δθ) via conductor 540.

In operation, multipliers 800, 802, 806, and 808 and summers 804 and 810 perform the calculation corresponding to I1', Q1' times the complex conjugate of I2', Q2'. (See equation 3.) Therefore, the output of summer 804 is the real portion, IM, of the resulting calculation, and the output of summer 810 is the imaginary portion, QM, of the resulting calculation. Phase estimation circuitry 506 receives IM and QM and calculates a phase corresponding to IM+jQM, which, as discussed above in reference to equation 4, can be represented as $e^{j\Delta\theta}$. This phase represents the phase difference between I1', Q1' and I2', Q2', using I1', Q1' as a reference signal.

Multiplier 812 receives IM and multiples this result by 1/N and gain 801 to provide it to adder 816. In one embodiment, gain 801 is the inverse of the larger amplitude of AMP1 and AMP2 (e.g. if AMP2>AMP1, gain 801 would be set to 1/AMP2). Gain 801 helps maintain the signals I1', Q1' as large as possible while still guaranteeing that the calculations do not exceed the selected number system used in the design. (Therefore, note that QM and IM used in reference to FIG. 8 now refer to the gain adjusted values as adjusted by gain 801. Also note that gain 801 is optional or may be set to one.) Adder 816, delay unit 820, and storage circuitry 824 function to accumulate values of IM over a window of time. Once again, as discussed above, N is representative of the number of samples or the window size for collecting values of IM. Delay unit 820 and storage circuitry 824 are reset upon reaching a fraction of the sample frequency, Fs/N, where Fs corresponds to the sampling frequency of the incoming signal (e.g. I1', Q1'). That is, each time a sufficient number of data is taken, which is determined by Fs and N, the value is stored in storage circuitry 824. Therefore, multiplier 828 receives accumulated values of IM/N from storage circuitry 824. The same analysis applies to QM. That is, multiplier 814 receives QM and multiplies it by 1/N and gain 801 and provides the output to adder 818. Adder 818, delay unit 822, and storage circuitry 826 function as an accumulator to accumulate values of QM/N over a period of time. The number of samples is determined by the Fs and N. That is, every Nth sample (relative to the sampling frequency Fs) the value in storage circuitry 826 is provided to multiplier 830.

The output of multiplier 828 is therefore representative of $\overline{IM^2}$ and the output of multiplier 830 is representative of $\overline{QM^2}$. (Note that $\overline{IM^2}$ and $\overline{QM^2}$ refer to the average values of $IM^2$ and $QM^2$ over the period of time defined by N.) These are provided to adder 832 which provides the result $\overline{IM^2}+\overline{QM^2}$ to inverse square unit 834. Inverse square root unit 834 calculates the inverse square root unit as shown in equation 12:

Equation 12:

$$\frac{1}{\sqrt{\overline{IM^2} + \overline{QM^2}}}$$

This result is provided to both multipliers 836 and 838. Multiplier 836 also receives $\overline{IM}$ from storage circuitry 824, and multiplier 838 receives $\overline{QM}$ from storage circuitry 826. Thus the result of multipliers 836 and 838, as shown in equations 13 and 14 below, represents the phase difference between I1', Q1' and I2', Q2', using I1', Q1' as the reference signal.

Equation 13:

$$\frac{\overline{IM}}{\sqrt{\overline{IM^2} + \overline{QM^2}}}$$

Equation 14:

$$\frac{\overline{QM}}{\sqrt{\overline{IM^2} + \overline{QM^2}}}$$

In the equations above, equation 13 corresponds to the output cos(Δθ) and equation 14 corresponds to the output sin(Δθ), where cos(Δθ)+j sin(Δθ) represents the phase difference. (See equation 4 above.)

Figure 9:
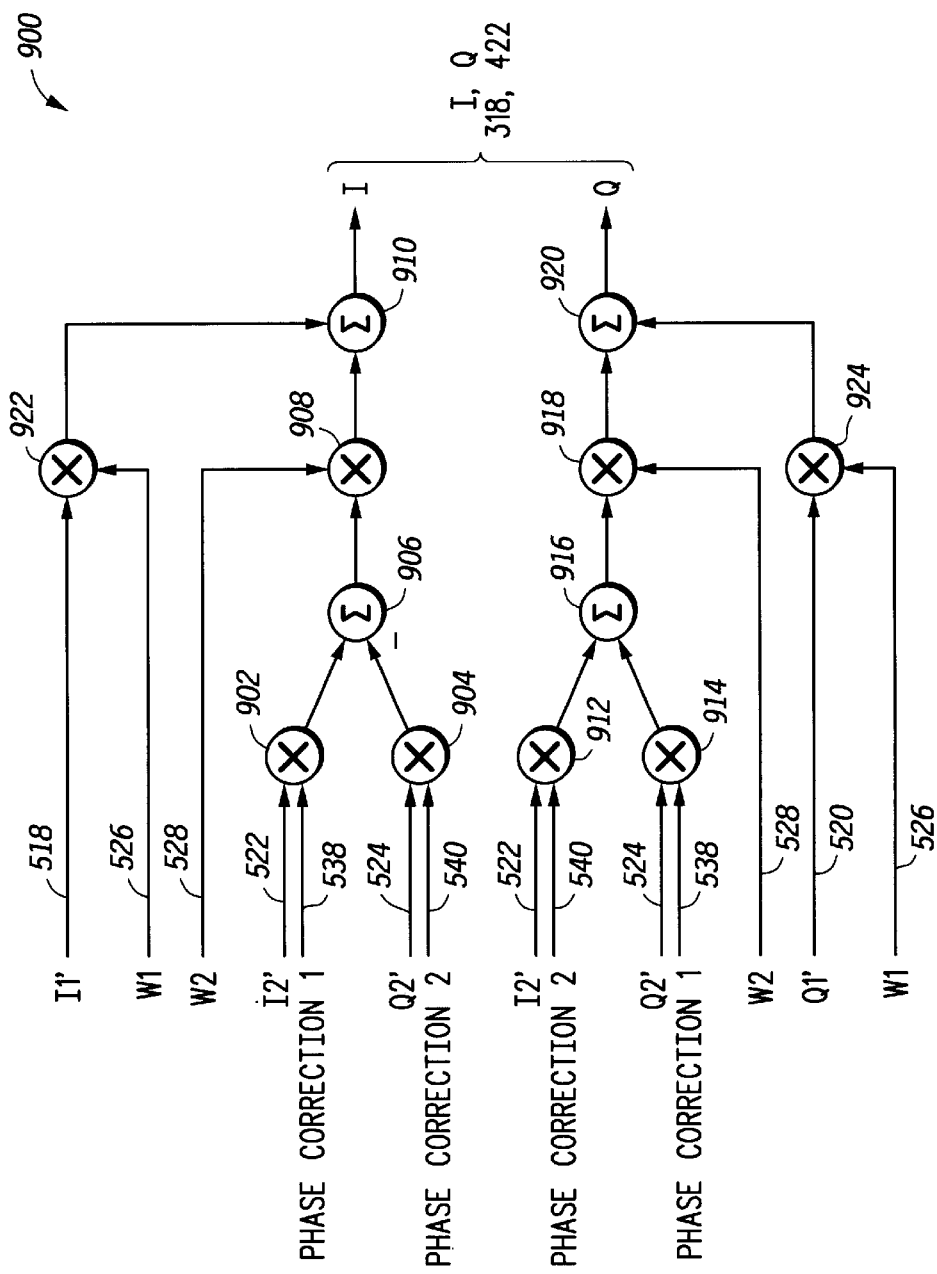
FIG. 9 illustrates, in block diagram form, a portion of the diversity combining unit of FIG. 5, according to one embodiment of the present invention.

FIG. 9 illustrates an implementation of multipliers 508, 512, and 514 and summer 516 of FIG. 5. FIG. 9 includes multipliers 922, 902, 904, 912, 914, 908, 918, and 924. FIG. 9 also includes summer 906, 910, 916, and 920. Multiplier 922 receives I1' and W1 as inputs and provides the output to summer 910. Multiplier 902 receives I2' and phase correction 1 and provides its output to summer 906. Multiplier 904 receives Q2' and phase correction 2 and provides the negative of its output to summer 906. The result of summer 906 is provided to multiplier 908 which also receives W2 as an input. The result of multiplier 908 is provided to summer 910 which also receives the output of multiplier 922. The output of summer 910 is provided as I via conductor 318 or 422, depending upon the embodiment. Likewise, multiplier 924 receives Q1' and W1 and provides an output to summer 920. Multiplier 912 receives I2' and phase correction 2 and provides its output to summer 916. Multiplier 914 receives Q2' and phase correction 1 and provides its output to summer 916. Summer 916 provides its output to multiplier 918 which receives W2 as an input and provides its output to summer 920. Summer 920 provides as its output Q via conductor 318 or 422 once again depending upon the embodiment. Therefore, the circuitry of FIG. 9 is representative of equation 7 above.

FIG. 10 illustrates an alternate embodiment of diversity combining units 304 and 404. That is, the circuitry of FIG. 10 can be interchanged with the circuitry of FIG. 5. In the embodiment of FIG. 10, diversity combining units 304 and 404 include demultiplexers (DEMUXs) 1000 and 1002 coupled to signal characteristic value estimation circuitry 1004, multiplexer 1006, and multiplier 1012. Signal characteristic value estimation circuitry 1004 is coupled to MUX 1006 via conductor 1028. Multiplier 1012 is coupled to phase lock loop and lock detection circuitry 1008 which is coupled to multiplier 1018. DEMUX 1002 is also coupled to multiplier 1018, and multiplier 1018 is coupled to summer 1014. Summer 1014 is coupled to demultiplexer 1000 and multiplexer 1010. Phase lock loop and lock detection circuitry 1008 is also coupled to multiplexer 1010 via conductor 1046. Multiplexer 1010 provides the output I, Q via conductors 318 or 422 corresponding to FIG. 3 or 4, respectively. DEMUX 1000, DEMUX 1002, signal power estimation circuitry 1004, MUX 1006, and phase lock loop and lock detection circuitry 1008 each receive control signals via conductors 138. Conductor 1028 may be a subset of conductors 138 or may be provided directly by signal characteristic value estimation circuitry 1004.

In operation, DEMUX 1000 receives signals I1', Q1' and provides I1' via conductor 1020 and Q1' via conductor 1022. Likewise, DEMUX 1002 receives I2', Q2' and provides I2' via conductor 1024 and Q2' via conductor 1026. (Again, note that I1', Q1' and I2', Q2' are gain adjusted when using the embodiment of FIG. 3, but are not yet gain adjusted if using the embodiment of FIG. 4.) Signal characteristic value estimation circuitry 1004 receives I1', Q1', I2' and Q2' and estimates a value of a signal characteristic for both I1', Q1' and I2', Q2' in order to determine the stronger signal. For example, signal characteristic value estimation circuitry 1004 may estimate the power or amplitude of each signal and determine the stronger signal based on the power, amplitude, or both. Note that in alternate embodiments, other signal characteristics or other methods may be used to determine which is the stronger signal. Signal characteristic value estimation circuitry 1004 outputs a control signal via conductor 1028 to multiplexer 1006 in order to select the stronger of the two signals to be output to multiplexer 1010 via conductors 1030 and 1032. Multiplier 1012 receives I1', Q1', and I2', Q2' and calculates the phase information by multiplying I1', Q1 by the complex conjugate of I2', Q2'. The resulting calculation may be represented by IM+jQM and is provided to phase lock loop and lock detection circuitry 1008 via conductors 1034 and 1036. The phase lock loop and lock detection circuitry 1008 is used to estimate the phase difference between I1', Q1' and I2', Q2' which is output to multiplier 1018 as phase correction 1 via conductor 1038 and phase correction 2 via conductor 1040. If the phase lock loop is in lock, I2', Q2' is multiplied by the resulting phase difference in order to properly shift I2', Q2' prior to combining it with I1', Q1' by summer 1014. Therefore, the output of summer 1014 is representative of the combined signal I1', Q1' and the phase shifted I2', Q2'. Also, if the phase lock loop is in lock, a control signal is provided to MUX 1010 in order to select the output of summer 1014 to be output as I, Q rather than the output of MUX 1006, which simply represents the stronger of I1', Q1' and I2', Q2'. However, if the phase locked loop circuitry 1008 is unable to lock, a control signal is output to MUX 1010 via conductor 1046 to select the signal transmitted by conductors 1030 and 1032 to be provided as the output I, Q via conductor 318 or 422.

Therefore, the embodiment of the diversity-combining unit illustrated in FIG. 10 attempts to estimate the phase difference and shift I2', Q2' accordingly. However, if the phase lock loop is unable to lock into the proper phase, then signal power estimation circuitry 1004 provides the stronger of the two signals as output I, Q. Therefore, FIG. 10 may be referred to as a hybrid phase lock loop (PLL) system. An alternate embodiment may use a signal characteristic of each signal (such as amplitude, power, etc.) as a weighting factor when combining the signals in summer 1014. For example, I1', Q1' may be weighted by its associated power, while I2', Q2' may be weighted by its associated power, as was discussed in reference to FIG. 5. Alternate embodiments may even use different weighting factors other than those based on signal characteristics. The operation of FIG. 10 can better be understood in reference to FIG. 11.

Figure 11:
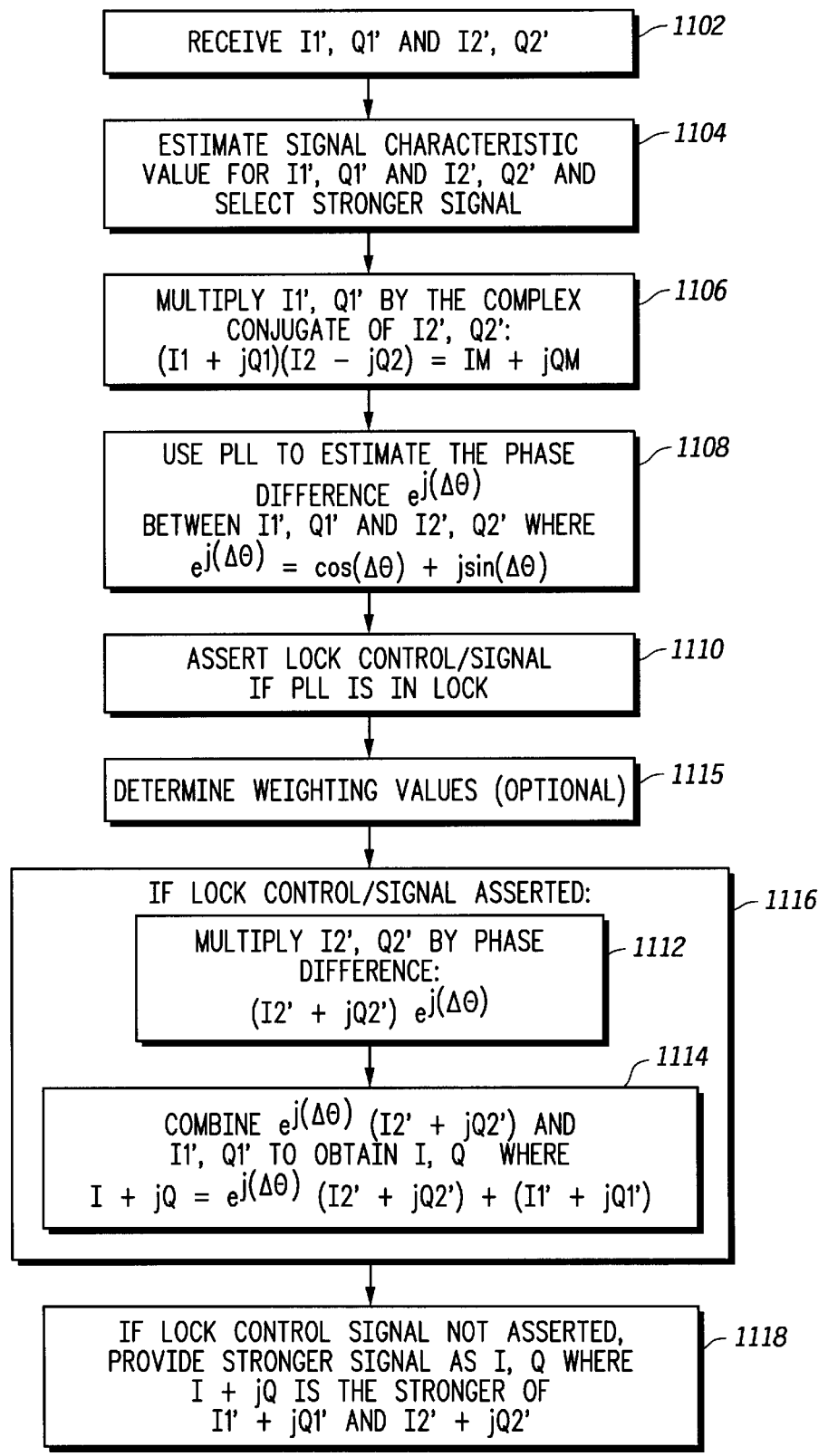
FIG. 11 illustrates, in flow diagram form, operation of the diversity combining unit of FIG. 10 in accordance with an alternate embodiment of the present invention.

FIG. 11 illustrates in flow diagram form one embodiment of the operation of diversity combining unit 304, 404 of FIG. 10. In block 1102, I1', Q1' and I2', Q2' are received. In block 1104, a signal characteristic value (such as, for example, power or amplitude) for each signal is estimated (which may be performed by signal characteristic value estimation circuitry 1004) and the stronger signal is selected. In block 1106, I1', Q1' is multiplied by the complex conjugate of I2', Q2' to obtain IM+jQM (see equation 3 above). In block 1108, the phase difference, $e^{j\Delta\theta}$, between I1', Q1' and I2', Q2' is estimated, where the phase difference can be represented as $\cos(\Delta\theta)+j\sin(\Delta\theta)$. This may be performed by phase lock loop and lock detection circuitry 1008 which outputs phase correction 1 (representative of $\cos(\Delta\theta)$) via conductor 1038 and phase correction 2 (representative of $\sin(\Delta\theta)$) via conductor 1040. In block 1110, the lock control signal is asserted if the phase lock loop of phase lock loop and lock detection circuitry 1008 is in lock. (Operation of phase lock loop and lock detection circuitry 1008 will be discussed further in reference to FIG. 12 below.) In block 1115, weighting values for I1', Q1; and I2', Q2' can be determined, as was described above in reference to weighting factor determination circuitry 502 of FIG. 5 However, block 1115 is optional, and the embodiments described herein in reference to FIGS. 10 and 11 assume that no-weighting factors are used in combining the signals. In block 1116, if the lock control signal is asserted, the signal I2', Q2' is multiplied by the phase difference calculated in block 1108, as shown in the following equation (see also block 1112):

$$e^{j\Delta\theta} \cdot (I2'+jQ2') \qquad \text{Equation 15}$$

In block 1114, if the lock control signal is asserted, the result of block 1112 is combined with I1', Q1' to obtain I, Q, as shown in the following equation:

$$I+jQ = e^{j\Delta\theta} \cdot (I2'+jQ2') + (I1'+jQ1') \qquad \text{Equation 16}$$

In block 1118, if the lock control signal is not asserted, indicating that the phase lock loop is not in lock, the stronger of signals I1', Q1' and I2', Q2' is provided as I, Q. (Note that equations 15 and 16 are similar to equations 5 and 7, respectively, except that no weighting factor appears in equations 15 and 16. However, as discussed in reference to FIG. 10 and optional block 1115 above, weighting factors may be used in combining the signals I1', Q1' and I2', Q2', similar to blocks 610, 612, and 614 of FIG. 6.)

Figure 12:
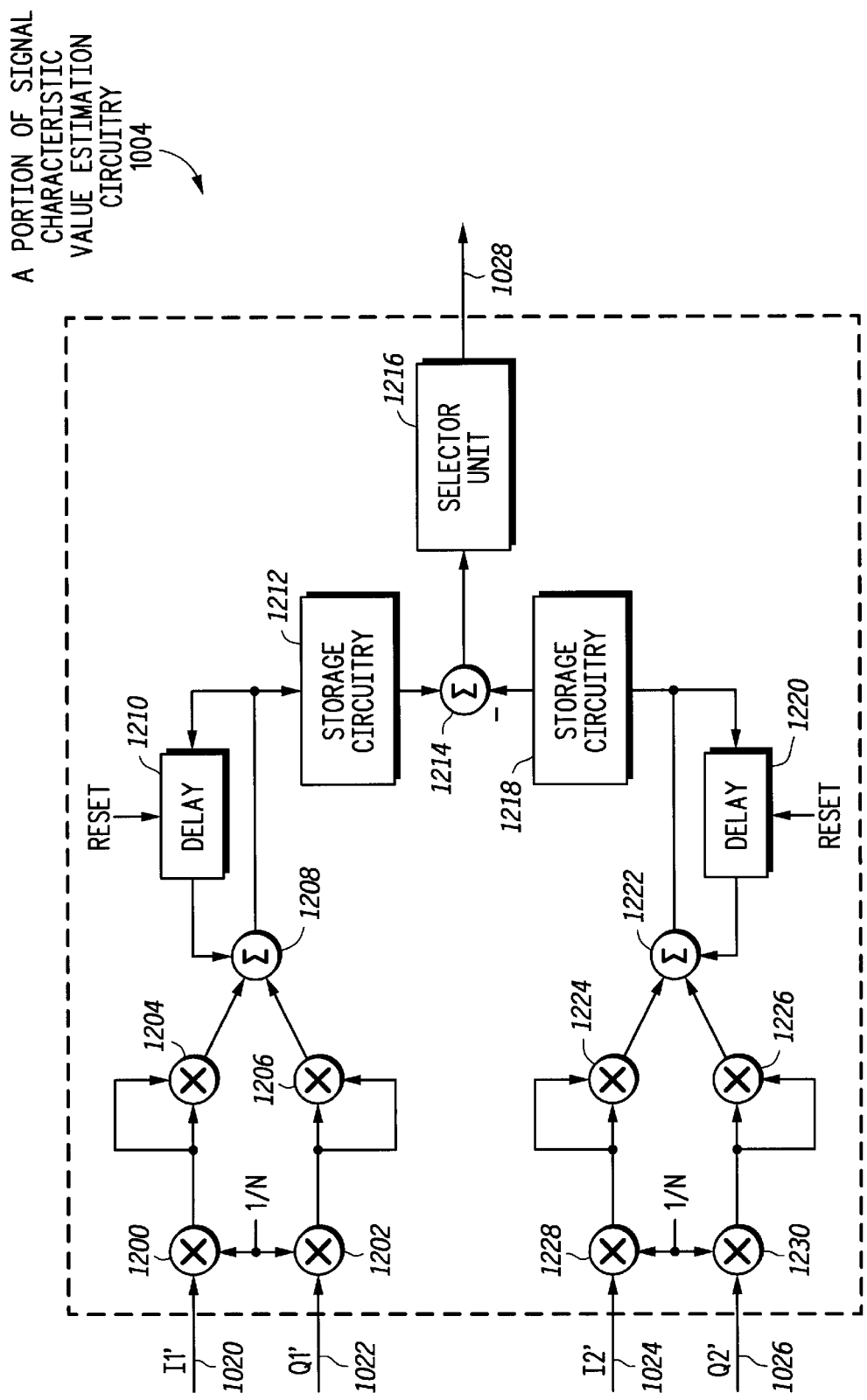
FIG. 12 illustrates, in block diagram form, a portion of the signal characteristic value estimation circuitry of FIG. 10, according to one embodiment of the present invention.

FIG. 12 illustrates one embodiment of signal characteristic value estimation circuitry 1004 that utilizes the power of each signal to determine the stronger signal. Signal characteristic value estimation circuitry 1004 of FIG. 12 includes multiplier 1200 coupled to multiplier 1204 and multiplier 1202 coupled to multiplier 1206. Multipliers 1204 and 1206 are coupled to summer 1208. Summer 1208 is coupled to delay unit 1210 and storage circuitry 1212. Storage circuitry 1212 is coupled to summer 1214 which is coupled to selector unit 1216. Multiplier 1228 is coupled to multiplier 1224, and multiplier 1230 is coupled to multiplier 1226. Multipliers 1224 and 1226 are coupled to summer 1222. Summer 1222 is coupled to delay unit 1220 and storage circuitry 1218. Storage circuitry 1218 is coupled to summer 1214. Selector unit 1216 provides a control signal via conductor 1028 to multiplexer 1006.

In operation, multiplier 1200 receives I1' and 1/N to provide I1'/N to multiplier 1204 which calculates the square value, $(I1'/N)^2$, and provides the result to summer 1208. Likewise, multiplier 1202 receives Q1' and 1/N to provide Q1'/N to multiplier 1206 which calculates the square of this result to provide $(Q1'/N)^2$ to summer 1208. Summer 1208 provides the result, $(I1'/N)^2+(Q1'/N)^2$, to storage circuitry 1212 and delay unit 1210. Summer 1208, delay unit 1210, and storage circuitry 1202 accumulate values of $(I1'/N)^2+(Q1'/N)^2$ over a period of time. Once again, this period of time is determined by the sampling frequency corresponding to the input signal I1', Q1'. N once again refers to the number of samples taken (i.e. window size). Once the proper number of samples is taken, storage circuitry 1212 provides the result, $\overline{I1'^2}+\overline{Q1'^2}$, to summer 1214, where $\overline{I1'^2}$ and $\overline{Q1'^2}$ are average values of $I1'^2$ and $Q1'^2$, respectively, over the period of time. Likewise, the same calculations are performed for I2', Q2'. Once again, the circuitry may either be repeated for I2', Q2' as illustrated in FIG. 12, or the circuitry corresponding to I1', Q1' may be shared by time multiplexing the two signals I1', Q1' and I2', Q2'. Therefore, summer 1222, delay unit 1220 and storage circuitry 1218 operate to accumulate values of $(I2'/N)^2+(Q2'/N)^2$ over a predetermined window of time which is determined by the sampling frequency of I2', Q2' and N. Therefore, the result provided to summer 1214 is $\overline{I2'^2}+\overline{Q2'^2}$ where $\overline{I2'^2}$ and $\overline{Q2'^2}$ are average values of $I2'^2$ and $Q2'^2$, respectively, over the predetermined window of time. Note that the values, $\overline{I1'^2}+\overline{Q1'^2}$ and $\overline{I2'^2}+\overline{Q2'^2}$ each correspond to the power of the respective signal, I1', Q1' and I2', Q2'.

The results from storage circuitries 1212 and 1218 are provided to summer 1214 which provides the difference between the two results, $\overline{I1'^2}+\overline{Q1'^2}$ and $\overline{I2'^2}+\overline{Q2'^2}$, to selector unit 1216. Selector unit 1216 determines which signal I1', Q1' or I2', Q2' is stronger and outputs the control signal via conductor 1028 accordingly. If I1', Q1' is the stronger signal, then the control signal output via conductor 1028 allows MUX 1026 to select I1', Q1' to be transferred to conductors 1030 and 1032 to MUX 1010. However, if selector unit 1216 selects I2', Q2' as the stronger signal, then MUX 1006 outputs I2', Q2' via conductors 1030 and 1032 to MUX 1010. Therefore selector unit 1216 can determine which signal has greater power. For example, if the value provided from summer 1214 to selector unit 1216 is greater than 0, this indicates the power of I1', Q1' is greater than I2', Q2'. However, if the difference is less than 0 (i.e. negative), this indicates that the power of I2', Q2' is greater than I1', Q1' and selector unit 1216 outputs the control signal accordingly.

Figure 13:
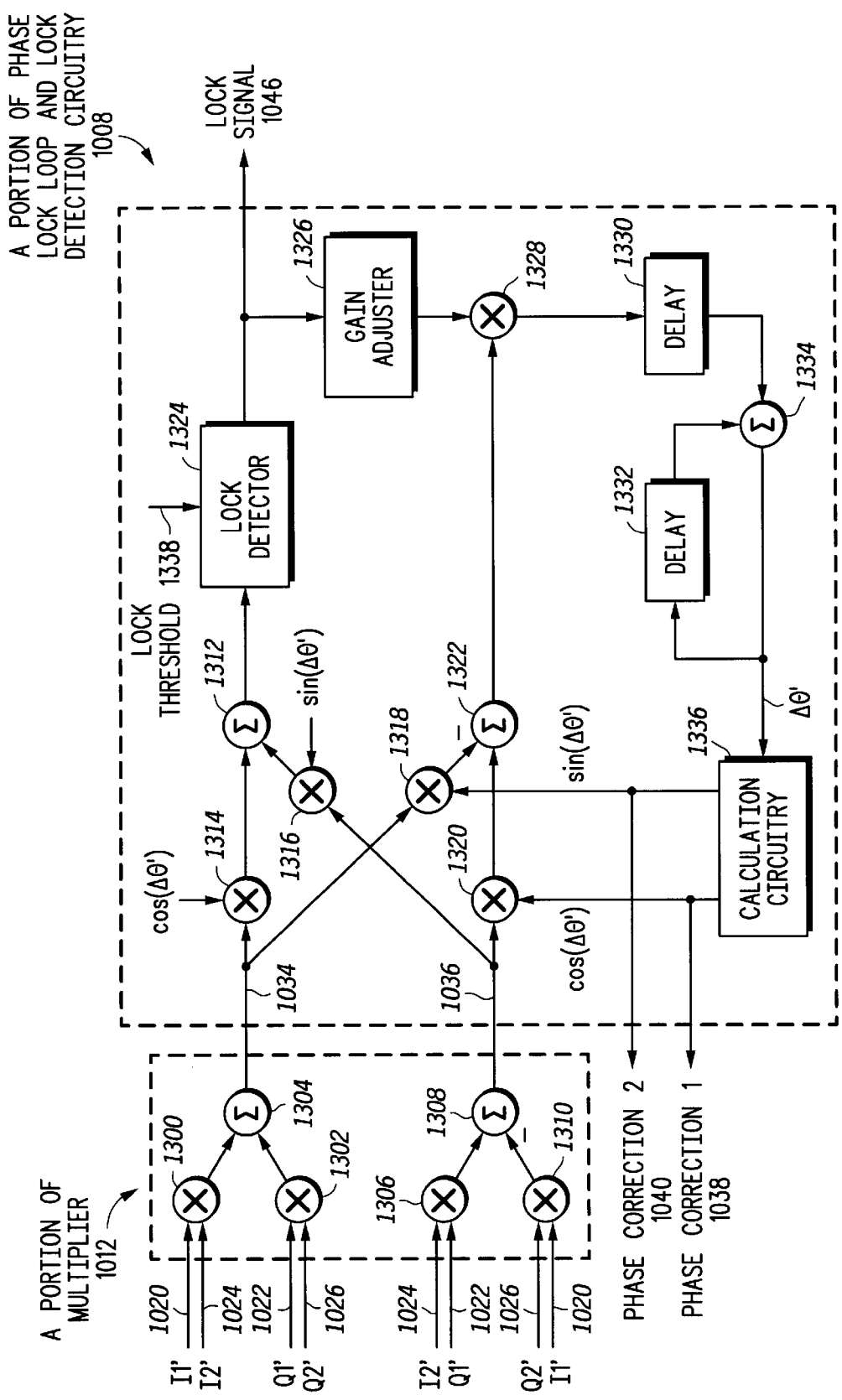
FIG. 13 illustrates, in block diagram form, a portion of a multiplier and phase lock loop and lock detection circuitry of FIG. 10, according to one embodiment of the present invention.

FIG. 13 illustrates a portion of multiplier 1012 and a portion of phase lock loop and lock detection circuitry 1008, according to one embodiment of the present invention. Multiplier 1012 includes multipliers 1300, 1302, 1306, and 1310, and summers 1304 and 1308. Multiplier 1300 receives I1' and I2', and multiplier 1302 receives Q1' and Q2'. The results of multipliers 1300 and 1302 are provided to summer 1304 whose output is provided to phase lock loop and lock detection circuitry 1008 via conductor 1034. Likewise, multiplier 1306 receives inputs I2' and Q1', and multiplier 1310 receives inputs Q2' and I1'. Multipliers 1306 and 1310 provide their outputs to summer 1308 which calculates the difference between the two values and provides the result to phase locked loop and detection circuitry 1008 via conductor 1036. Therefore, in operation, multiplier 1012 outputs the result of I1', Q1' times the complex conjugate of I2', Q2' in the form of IM+jQM where IM represents the real portion conducted via conductor 1034 and QM represents the imaginary portion conducted via conductor 1036. (See equation 3 above.)

Phase lock loop and lock detection circuitry 1008 includes multiplier 1314 coupled to summer 1312, and multiplier 1320 coupled to summer 1322. Summer 1312 is also coupled to multiplier 1316 and lock detector 1324. Summer 1322 is also coupled to multiplier 1318 and multiplier 1328. Gain adjuster 1326 is coupled to the output of lock detector 1324 and provides an input to multiplier 1328. Multiplier 1328 is coupled to delay unit 1330 which is coupled to summer 1334. Summer 1334 is coupled to calculation circuitry 1336 and delay unit 1332. Delay unit 1332 provides a feedback value to summer 1334. Calculation circuitry 1336 outputs phase correction 1 via conductor 1038 and phase correction 2 via conductor 1040. Calculation circuitry 1336 is also coupled to provide inputs to multipliers 1320, 1318, 1316, and 1314.

In operation, phase lock loop and lock detection circuitry 1008 includes a phase lock loop (PLL) portion to estimate the value of the phase difference of the incoming signal IM+jQM. This is performed through the use of a phase lock loop which is implemented by gain adjuster 1326, multiplier 1328, delay unit 1330, summer 1334, delay unit 1332, and calculation circuitry 1336. Phase lock loop begins with the initial value of $\Delta\theta'$ which is input to calculation circuitry 1336, where $\Delta\theta'$ represents the phase value of the PLL. For example, the initial value may be 0. During iterations of the PLL, $\Delta\theta'$ is adjusted until the PLL locks onto a phase value. The PLL locks when $\Delta\theta'$ is approximately equal to $\Delta\theta$, corresponding to IM+jQM. As will be discussed further below, the lock detector 1324 determines whether the PLL is in lock. Calculation circuitry 1336 receives the value $\Delta\theta'$ and provides the results of cosine and sine calculations to multipliers 1320, 1318, 1316, and 1314.

Multipliers 1314, 1316, 1320, 1318 and summers 1312 and 1322 calculate the result of multiplying the incoming signal, IM+jQM, by the complex conjugate of the resulting phase from the PLL, $\Delta\theta'$, which may be represented as $e^{-j\Delta\theta'}$, where:

$$e^{-j\Delta\theta'}=\cos(\Delta\theta')-j\sin(\Delta\theta') \qquad \text{Equation 17}$$

As was shown in reference to equation 4, the phase of IM+jQM may be represented as $e^{j\Delta\theta}$. Therefore, the result of the calculation can be represented as follows:

$$e^{j\Delta\theta} \cdot e^{-j\Delta\theta'}=e^{j(\Delta\theta-\Delta\theta')}=\cos(\Delta\theta-\Delta\theta')+j\sin(\Delta\theta-\Delta\theta') \qquad \text{Equation 18}$$

Conductor 1340 at the output of summer 1312 provides the real portion of the resulting calculation, $\cos(\Delta\theta-\Delta\theta')$, to lock detector 1324 while summer 1322 provides the imaginary portion of the resulting calculation, sin(Δθ-Δθ') to multiplier 1328. If lock detector 1324 determines that the PLL is not yet locked (i.e. that Δθ' is not sufficiently close to Δθ), then the gain adjuster 1326 adjusts the gain of the imaginary portion of the signal from 1322 via multiplier 1328 and an updated Δθ' is calculated. This updated Δθ' is provided to calculation circuitry 1336 which provides the cosine and sine values of Δθ' to multipliers 1314, 1316, 1318, 1320 in order to once again multiply the complex conjugate of this Δθ' by the incoming signal IM+jQM. This iterative process continues until the real portion of the resulting calculation provided by summer 1312 to lock detector 1324 is determined to provide a Δθ' that is within a predetermined range from Δθ. Since the real portion of the resulting calculation is represented by cos(Δθ-Δθ'), as Δθ' approaches Δθ, the result of the cosine calculation approaches 1 since the cos(0)=1. If lock detector 1324 determines that the incoming signal surpasses lock threshold 1338 (i.e. that Δθ' is sufficiently close to Δθ), a lock signal is provided via conductor 1046 to MUX 1010 to allow the combined output via conductor 1042 and 1044 to be output as I, Q. Also, once the lock detector asserts the lock signal via conductor 1046, this lock signal is also provided to gain adjuster 1326 in order to choose a smaller gain value for greater stability of the PLL. That is, once the PLL is in lock, a smaller gain provides a more stable system.

Figure 14:
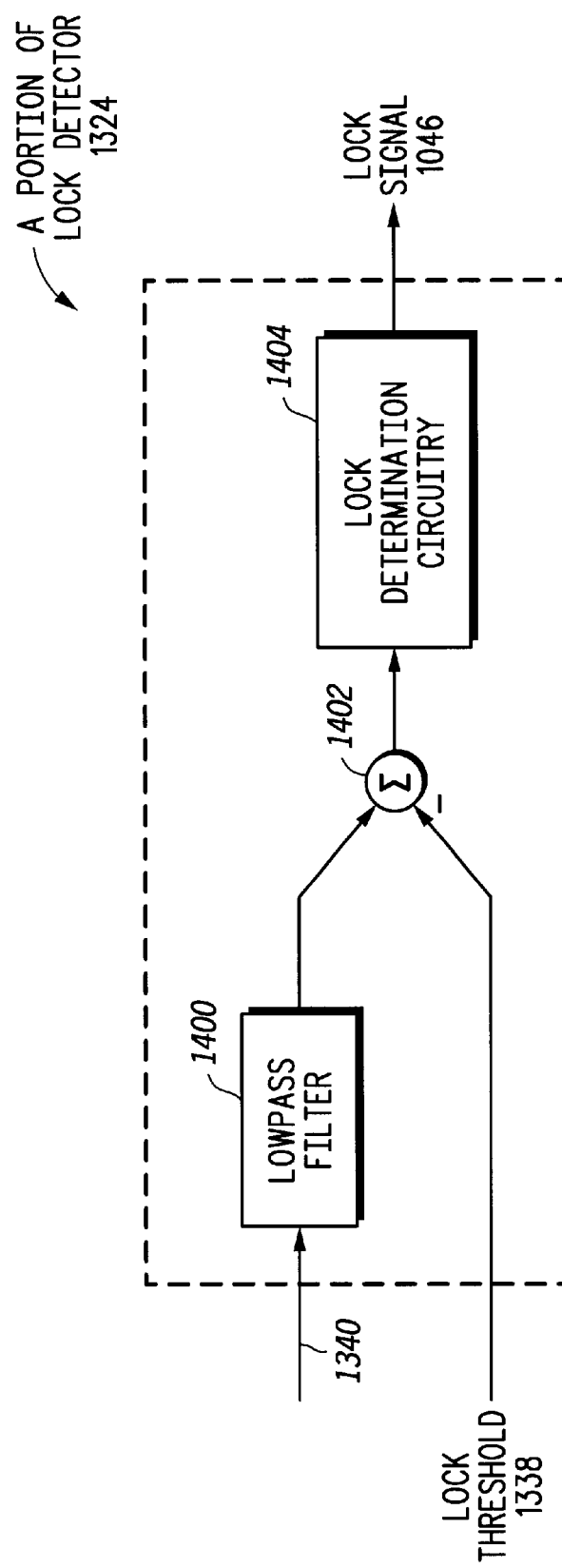
FIG. 14 illustrates, in block diagram form, a portion of the lock detector of FIG. 13, according to one embodiment of the present invention.

FIG. 14 illustrates one embodiment of lock detector 1324 of FIG. 13. The real portion of the resulting calculation that was discussed above in reference to FIG. 13 is provided via conductor 1340 to lock detector 1324 as an input to low pass filter 1400. The low pass filter removes the noise terms in the high frequency components of the incoming signals. The output of the low pass filter 1400 is provided to summer 1402 which also receives lock threshold 1338. Summer 1402 finds the difference between the filtered input from filter 1400 and lock threshold 1338 and provides the result to lock determination circuitry 1404 which provides the output lock signal via conductor 1046 to MUX 1010. Lock determination circuitry 1404 determines whether the difference at the output of summer 1402 is greater than 0 or less than 0 to determine whether the incoming signal is greater than or less than lock threshold 1338. If the input to lock determination circuitry is positive, lock determination circuitry asserts lock signal 1046 in order to select conductors 1042 and 1044 to provide the combination signal as I, Q at the output of MUX 1010. However, if lock determination circuitry 1404 determines that the output of summer 1402 is negative, lock signal 1046 is not asserted, thus selecting the output of MUX 1006 to provide the signal via conductors 1030 and 1032 as I, Q at the output of MUX 1010.

Figure 15:
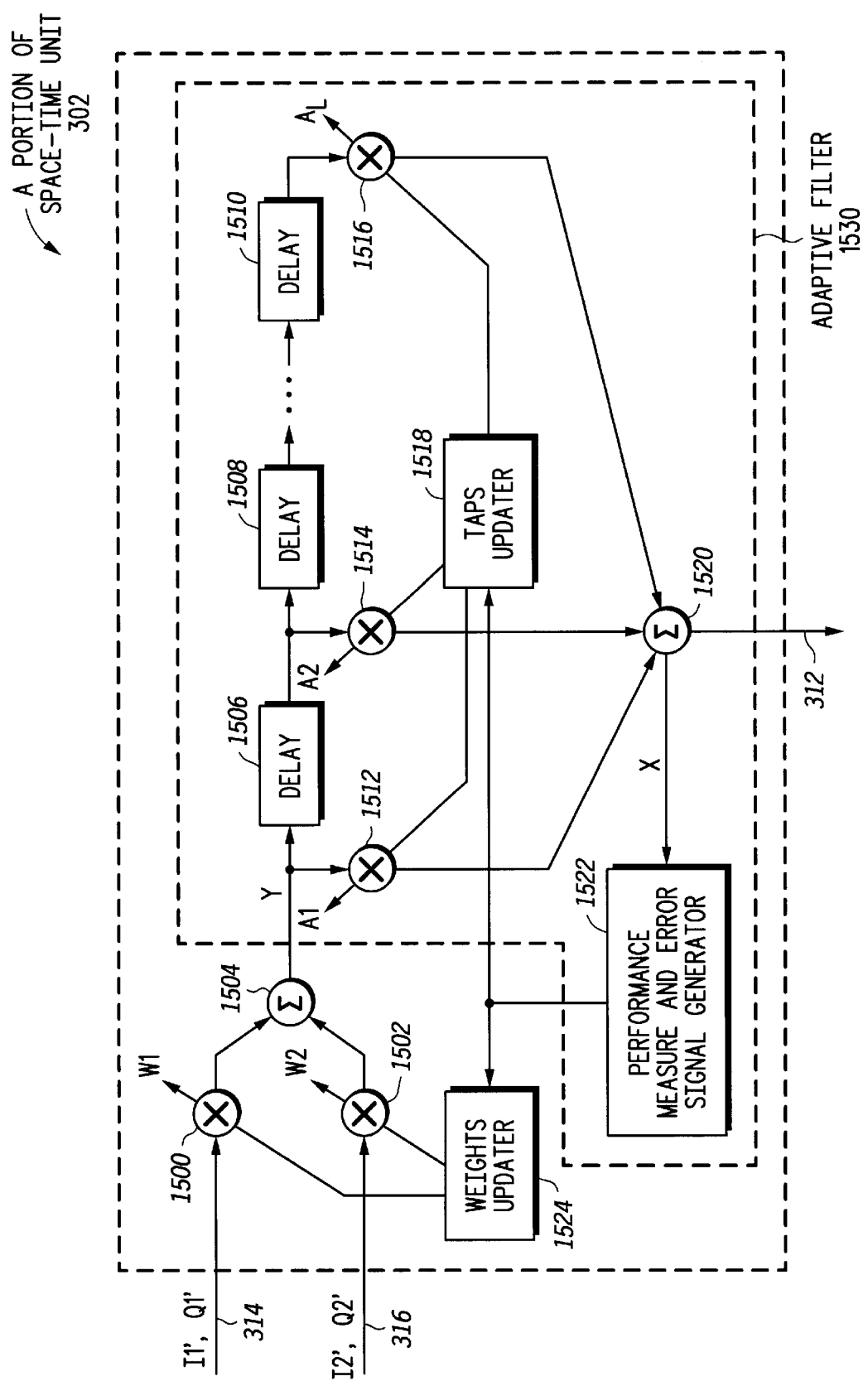
FIG. 15 illustrates, in block diagram form, a portion of the space time unit of FIG. 3, according to one embodiment of the present invention.

FIG. 15 illustrates one embodiment of space time unit 302 of FIG. 3. Space time unit 302 both diversity combines the incoming signals I1', Q1' and I2', Q2' via conductors 314 and 316 and provides echo canceling for the resulting signal. Space-time unit 302 provides for both the spatial combining of the incoming signals and the time domain filtering of the resulting signal. The time domain portion may also be referred to as the equalizer portion which performs echo canceling. (This equalizer portion may also be referred to as adaptive filer 1530 which includes performance measure and error signal generator 1522, multipliers 1512, 1514, and 1516, summer 1520, taps updater 1518, and delays 1506, 1508, and 1510.) The incoming signals I1', Q1' and I2', Q2' are combined via multipliers 1500 and 1502 and summer 1504. I1', Q1' is weighted by weight factor W1 which is input to multiplier 1500 from weight updater 1524. Likewise, I2', Q2' is weighted with weight factor W2 via multiplier 1502 where W2 is also provided by weight updater 1524. Therefore, the weighted results are provided to summer 1504 to produce a combined weighted signal that is then provided to delay unit 1506 and multiplier 1512. Both W1 and W2 represent complex numbers. The output of summer 1504 is propagated through delay units 1506, 1508 and 1510. The output of summer 1504 and the outputs of each delay unit such as 1506, 1508 and 1510 are provided to corresponding multipliers 1512, 1514, and 1516 where the results are multiplied by corresponding taps such as A1, A2, and AL. The outputs of the multipliers 1512, 1514, and 1516 are then provided to summer 1520 to produce a combined echo canceled output which is provided to performance measure and error signal generator 1522 and to MUX 306 and multipath echo detector and signal quality monitor 300 via conductor 312. Performance measure and error signal generator 1522 provides information to weight updater 1524 and tap updater 1518 to update the values of the weights and taps accordingly. Note that the taps (A1, A2, and AL) also represent complex numbers. The number of delay units such as 1506 and 1508 and multipliers such as 1512 and 1514 and taps such as A1 and A2 are dependent upon the number of taps in this equalizer portion.

The weights of the spatial combiner (e.g. W1 and W2) and the taps of the equalizer (e.g. A1, A2 . . . ., AL) are chosen so that the variation of the amplitude of the resulting signal at the output of summer 1520 is minimized. The number of taps within the equalizer portion are also chosen to improve the quality of the resulting signal with a trade-off of requiring more hardware or software, depending on the implementation. Performance measure and error signal generator 1522 performs a modified constant modulus algorithm to update both the weights and the taps in order to minimize the variation of the amplitude in the resulting signal at the output of summer 1520. (Therefore, in one embodiment, the same criteria is used for updating the weights in the spatial domain as for updating the adaptive filter taps in the time domain, as will be illustrated with respect to equations 19–26 below.) Space-time unit 302 can therefore make use of the constant modulus feature of incoming FM signals. That is, FM signals should maintain a constant amplitude. However, due to the introduction of multipath echo and noise, the amplitude of the incoming FM signals do not remain constant. Therefore, the weights and taps are used to minimize the variation in amplitude caused by the multipath echo. Note also that the implementation illustrated in FIG. 15 applies to not only receiving two antenna signals but can be expanded to combine and echo cancel signals from any number of antennas. In this embodiment, each incoming signal would be weighted by a corresponding weight factor prior to being provided to summer 1504. Likewise, the equalizer portion (i.e. adaptive filter 1530) may be designed with any number of taps.

Performance measure and error signal generator 1522 provides the proper information to weight updater 1524 and taps updater 1518 using a modified constant modulus algorithm, which will be explained in reference to the equations below. In this algorithm, a cost function is defined as follows:

Equation 19:

$$J = \frac{1}{4}E[|X(k)|^2 - 1]^2$$

In the above equation X(k) is the resulting signal after space-time processing at the output of summer 1520, and k represents the sampling time instance given by $t=kT_s$ where $T_s$ is the sampling period. The above equation is expressed as an expectation of a random process because the received signals (e.g. I1', Q1' and I2', Q2') are statistical rather than deterministic. One goal of space-time unit 302 is to minimize the cost function, J, which is accomplished through the variation of the weights and taps, as will be discussed further below.

Note that the received signals I1', Q1' and I2', Q2' may also be represented generically as $r_m(k)$ where m=1,2, . . . N, N being the number of antennas in the receiver and k being the sampling time instance given by $t=kT_s$. Also note that the weights, W1 and W2, can be represented as $W1=W1_R+jW1_I$ and $W2=W2_R+jW2_I$, respectively. The subscript R is used to denote the real portion of the complex number, while the subscript I is used to denote the imaginary portion. Also, they may be represented generically as $W_m(k)$ where m=1, 2, . . . N, N being the number of antennas in the receiver and k being the sampling time instance. Likewise, A1, A2, . . . AL can be represented as $A1=A1_R+jA1_I$, etc., or generically as $A_n(k)$ where n=1, 2, . . . L, L being the number of taps of the equalizer and k being the sampling time instance. Therefore, in the equations given herein, different representations may be used.

The following equation represents the combination of all signals from different antennas. This signal Y(k) at the output of summer 1504 is represented as shown in the following equation:

Equation 20:

$$Y(k) = \sum_{m=1}^{N} r_m(k) \times W_m(k)$$

The above equation is a general equation for any number of antennas within the system. In the embodiment illustrated in FIG. 15 having two antennas, the equation for Y (k) can be expressed as follows:

$$Y(k)=(I1'+jQ1')\cdot(W1_R+jW1_I)+(I1'+jQ2')\cdot(W2_R+jW2_I) \quad \text{Equation 21}$$

Therefore, the equalized signal obtained at the output of summer 1520 can be represented as follows:

Equation 22:

$$X(k) = \sum_{n=1}^{L} Y(k-n) \times A_n(k)$$

In the above equation, L represents the number of taps in the equalizer portion of space-time unit 302. Y(k−n) represents the weighted and combined signals at the output of summer 1504 (see also equation 20 above) shifted in time by delay units 1506, 1508, 1510, etc.

In order to minimize the cost function, J, the partial derivative of the cost function with respect to the complex conjugate of the weights is set to 0 as is the partial derivative of the cost function with respect to the complex conjugate of the taps. The equations are therefore given as follows:

Equation 23:

$$\frac{\partial J}{\partial W_m^*} = 0 \quad m = 1, 2, \ldots N$$

Equation 24:

$$\frac{\partial J}{\partial A_n^*} = 0 \quad n = 1, 2, \ldots L$$

A statistic gradient may be used to find the solutions of the above equations. Therefore, the updating equations for the weights and taps results as follows:

$$W_m(k+1)=W_m(k)-\mu\times(|X(k)|^2-1)\times X(k)\times A_1^*(k)\times r_m^*(k), \quad \text{Equation 25}$$

for m=1,2, . . . N $$A_n(k+1)=A_n(k)-\mu\times(|X(k)|^2-1)\times X(k)\times Y^*(k-n), \quad \text{Equation 26}$$

for n=1, 2, . . . L

In the above two equations, equations 25 and 26, $\mu$ is a constant representing the step-size while k represents the sampling instant, $t=kT_S$. Therefore, the above equations represent a time average of the weights and taps.

As discussed in reference to FIG. 3 the output of summer 1520 is fed back to multipath echo detector and signal quality monitor 300 to determine if the echo of the calculated signal has been reduced below the predetermined threshold of allowable echo. If so, the control signal via conductor 320 selects conductor 312 to be provided via MUX 306 to conductor 208 as Icomb, Qcomb. However, if multipath echo detector signal quality monitor 300 determines that the echo remains above the predetermined threshold value, space-time unit 302 performs another iteration to further reduce multipath echo from the signal, thus repeating the process.

FIG. 16 illustrates one embodiment of multipath echo detector signal quality monitor 300, 402 as used in FIGS. 3 and 4. Modulus circuitry 1600 receives input signals I1', Q1' and I2', Q2' via conductors 314 and 316, respectively, if the embodiment of FIG. 3 is used. In the embodiment of FIG. 4, multipath echo detector and signal quality monitor 402 receives the combined I1', Q1' and I2', Q2' signal via conductor 416. Modulus circuitry 1600 then calculates the modulus of the digital complex baseband signals. Ideally, the results should equal a constant value. However, in time varying mobile channels, the transmitted signal may be affected by channel fading. In an FM radio system, though, the variation of the channel is usually slow compared to the bandwidth of broadband FM signals. Therefore, band pass filter 1602 may be used to extract the variation of the modulus caused by the multipath echo and ignore the slow variation of the channel. The average signal strength of the output of band pass filter 1602 is then calculated by average signal strength detector 1604. Comparison circuitry 1606 then compares the average signal strength to a preset value such as threshold strength 1608. A decision is then made based upon the comparison result. If the average signal strength is larger than the threshold strength value 1608, then the received signals I1', Q1' or I2', Q2' or their combination require echo canceling processing. That is, in the embodiment of FIG. 3, I1', Q1' and I2', Q2' are sent to space time unit 302 to deal with the frequency selective fading channel. In the embodiment of FIG. 4, multipath echo detection signal quality monitor 402 enables echo canceller 406 to perform echo canceling on the signal received from diversity combining unit 404 prior to outputting the results to conductor 208 as Icomb, Qcomb.

Note that the various hardware units and circuitry described throughout the application can be reused or shared by various functions. For example, the circuitry 1718 illustrated in FIG. 17 could be used to implement a state machine that controls execution of other functions described herein above, and is not limited to just computing the weighting factors W1 and W2. Embodiments of the present invention can be implemented in hardware, software, or in a combination of both. For example, some embodiments may be implemented by a finite state machine having control circuitry with microcode to control execution of the state machine. Alternatively, software code may be used to perform the above functions.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A baseband unit for receiving a first signal from a first receiving source and for receiving a second signal from a second receiving source, said baseband unit providing an output, said baseband unit comprising:
   a first unit for combining the first signal and second signal using a first algorithm, wherein the first unit combines the first and second signals to form a combined signal and comprises:
      an adaptive filter to filter the combined signal, and
      a weights updater, coupled to the adaptive filter, wherein the weights updater provides a weighting value for weighting at least one of the first and second signals when the first and second signals are combined to form the combined signal; and
   a second unit for combining the first signal and second signal using a second algorithm; and
   a signal quality monitor for monitoring a first quality level of the first signal and a second quality level of the second signal and for selecting whether the first unit or second unit is used to provide the output.

2. A baseband unit as in claim 1, wherein the weights updater is adaptive.

3. A baseband unit as in claim 2, wherein a same criteria is used to update weights produced by the weights updater and to update the adaptive filter.

4. A baseband unit as in claim 1, wherein the second unit comprises:
   a diversity combining unit.

5. A baseband unit as in claim 4, the diversity combining unit comprises:
   phase estimation circuitry.

6. A baseband unit as in claim 5, wherein the diversity combining unit further comprises:
   weighting factor determination circuitry, coupled to the phase estimation circuitry.

7. A baseband unit as in claim 6, wherein the phase estimation circuitry comprises a phase lock loop and lock detection circuitry.

8. A baseband unit as in claim 1, further comprising:
   an echo canceller, coupled to the signal quality monitor.

9. A baseband unit as in claim 8, wherein said echo canceller performs echo cancellation when diversity combining is used in said baseband unit.

10. A baseband unit for receiving a first signal from a first receiving source and for receiving a second signal from a second receiving source, said baseband unit providing an output, said baseband unit comprising:
    a first unit for combining the first signal and second signal using a first algorithm; and
    a second unit for combining the first signal and second signal using a second algorithm; and
    a signal quality monitor for monitoring a first quality level of the first signal and a second quality level of the second signal and for selecting whether the first unit or second unit is used to provide the output, wherein the signal quality monitor comprises:
    modulus circuitry;
    a filter, coupled to the modulus circuitry;
    an average signal strength detector, coupled to the filter; and
    comparison circuitry, coupled to the average signal strength detector, said comparison circuitry comparing an average signal strength of the first signal to a predetermined threshold value and comparing an average signal strength of the second signal to the predetermined threshold value.

11. A baseband unit as in claim 10, wherein the signal quality monitor selects the first unit if the average signal strength of either the first signal or the second signal exceeds the predetermined threshold value by a predetermined amount.

12. A baseband unit for receiving a first signal from a first receiving source and for receiving a second signal from a second receiving source, said baseband unit providing an output, said baseband unit comprising:
    a unit for combining the first signal and second signal and providing a combined signal;
    a signal quality monitor for determining a quality characteristic of the combined signal and for providing a control signal, wherein the quality characteristic comprises multipath echo information; and
    an echo canceller which receives the control signal from the signal monitor and which is selectively used to perform echo cancellation on the combined signal based on the quality characteristic.

13. A baseband unit as in claim 12, wherein the unit for combining comprises a diversity combining unit.

14. A baseband unit as in claim 13, wherein the diversity combining unit comprises phase estimation circuitry.

15. A baseband unit as in claim 13, wherein the diversity combining unit comprises a phase lock loop.

16. A baseband unit for receiving a first signal from a first receiving source and for receiving a second signal from a second receiving source, said baseband unit providing an output, said baseband unit comprising:
    a signal quality monitor for determining a quality characteristic of at least one of the first signal and the second signal and for providing a control signal, wherein the quality characteristic comprises multipath echo information;

a unit for combining the first signal and second signal and providing a combined signal; and an echo canceller which receives the control signal from the signal monitor and which is selectively used to perform echo cancellation on the combined signal based on the quality characteristic.

17. A baseband unit as in claim 16, wherein the unit for combining comprises a diversity combining unit.

18. A baseband unit as in claim 16, wherein the unit for combining comprises a space-time unit.

* * * * *